Feb. 26, 1946.  C. L. OSWALD  2,395,500
REPEATING FLASH AND SYNCHRONIZING APPARATUS
Filed June 19, 1943  4 Sheets-Sheet 1
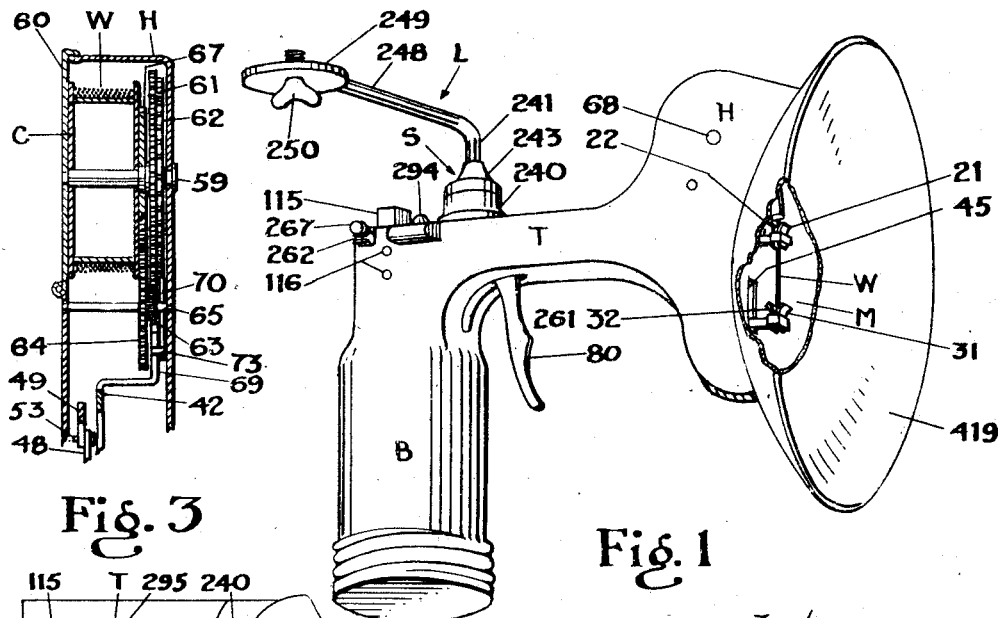
Fig. 1
Fig. 3
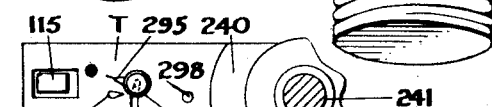
Fig. 4
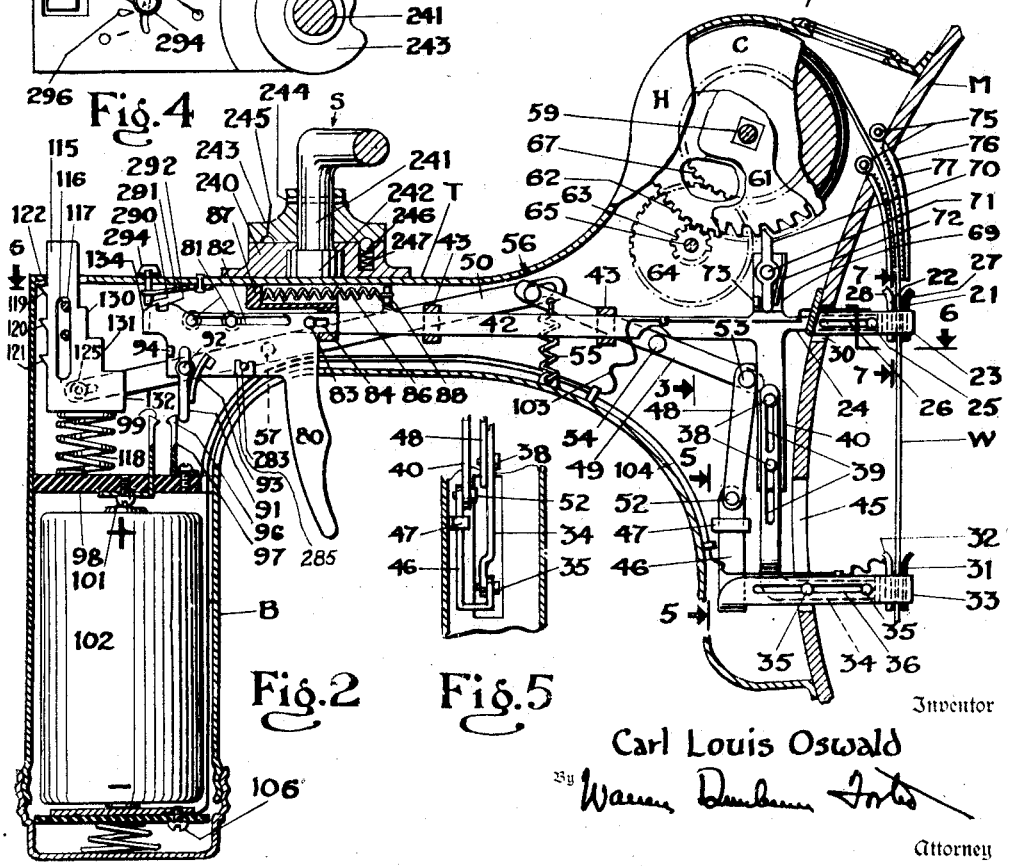
Fig. 2  Fig. 5
Inventor
Carl Louis Oswald
By Warren Dunham Foster
Attorney Feb. 26, 1946.            C. L. OSWALD                 2,395,500
              REPEATING FLASH AND SYNCHRONIZING APPARATUS
                     Filed June 19, 1943         4 Sheets-Sheet 2
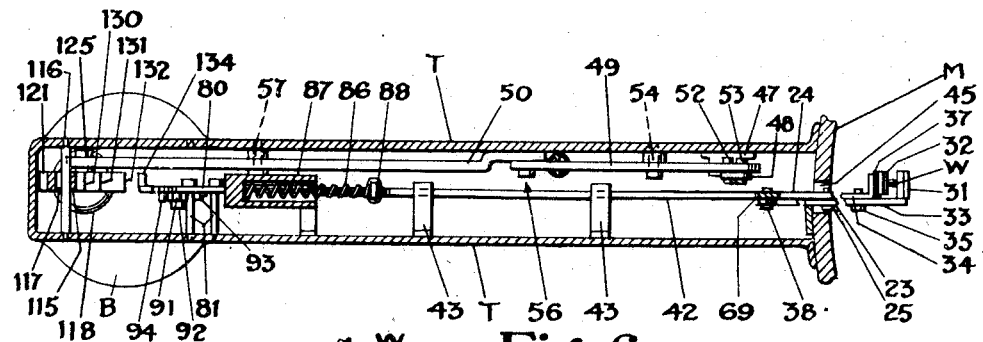
Fig. 6
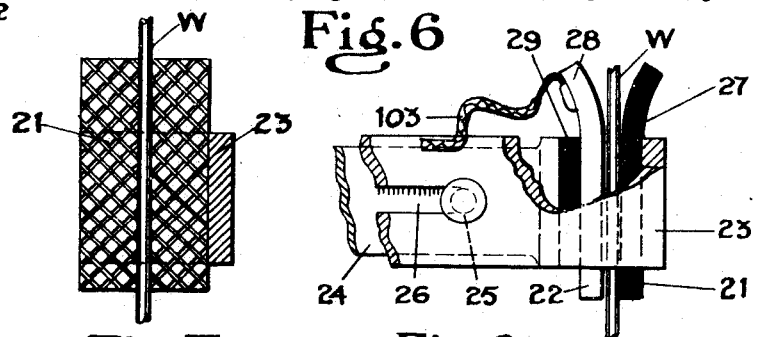
Fig. 7     Fig. 8
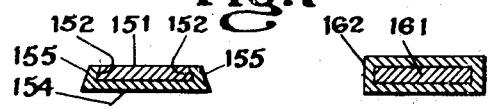
Fig. 9   Fig. 10   Fig. 11
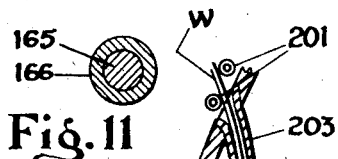
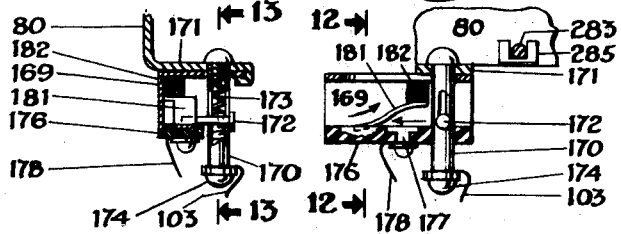
Fig. 12   Fig. 13
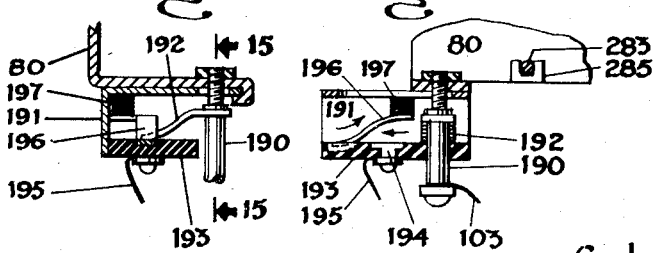
Fig. 14   Fig. 15
Fig. 16
Inventor
Carl Louis Oswald
By Warren Denham Foster
                Attorney Feb. 26, 1946.  C. L. OSWALD  2,395,500
REPEATING FLASH AND SYNCHRONIZING APPARATUS
Filed June 19, 1943  4 Sheets-Sheet 3
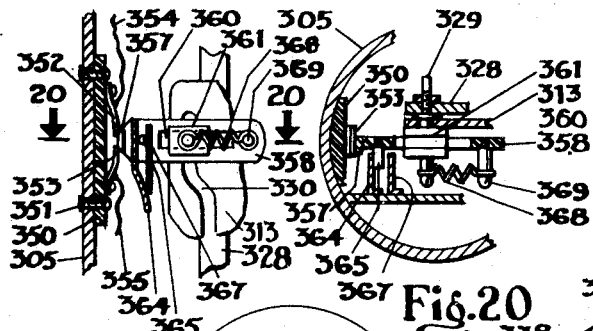
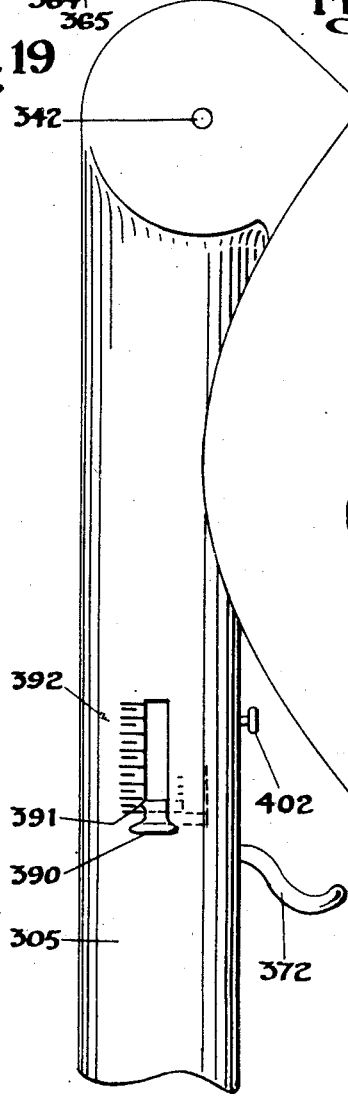
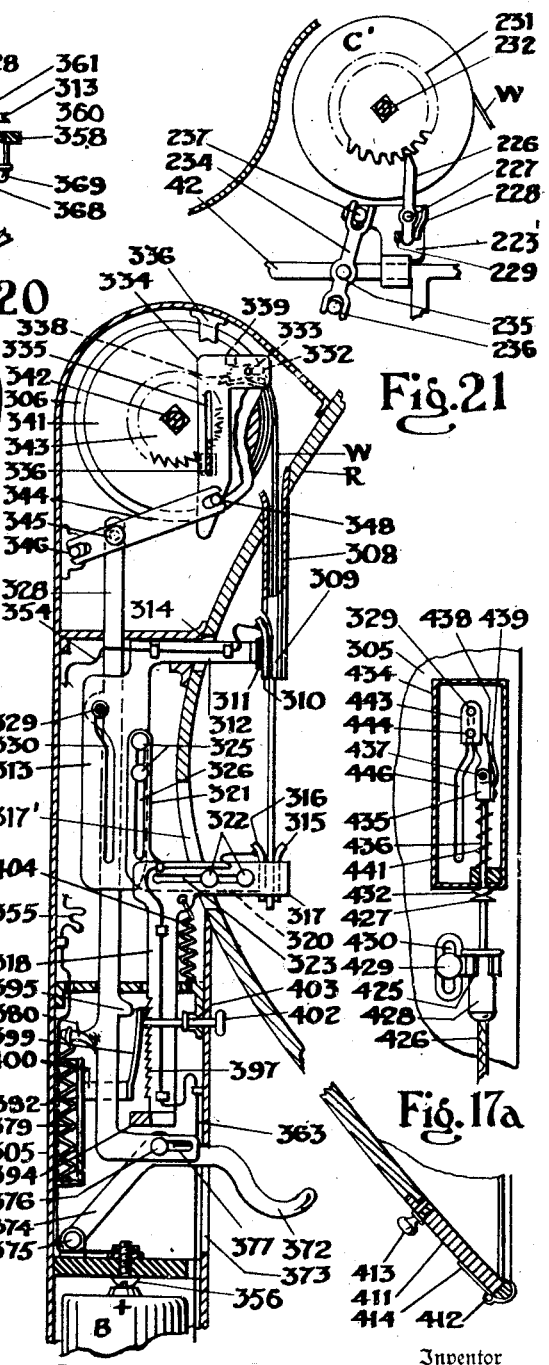
Inventor
Carl Louis Oswald
By Warren Dunham Foster
Attorney

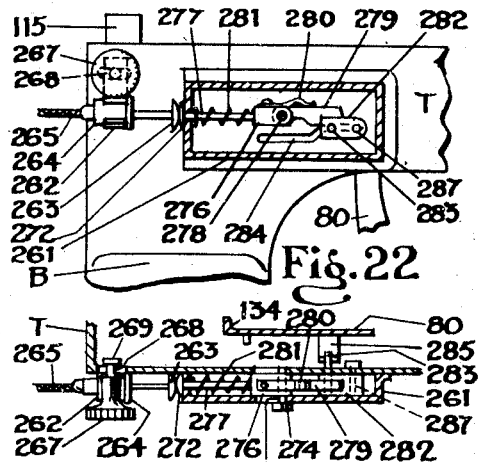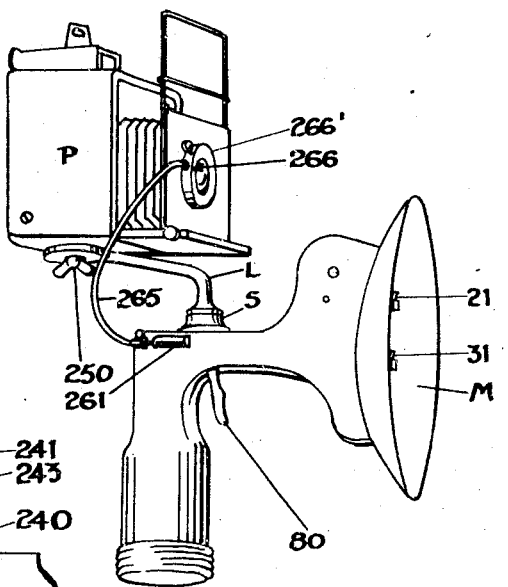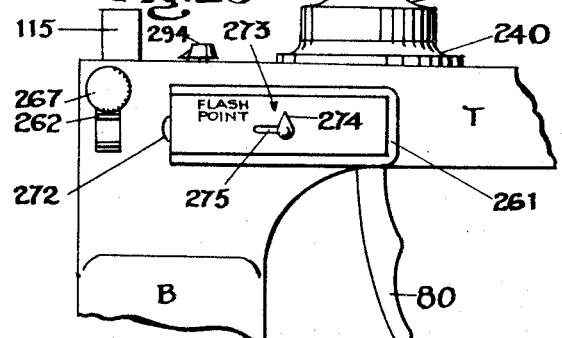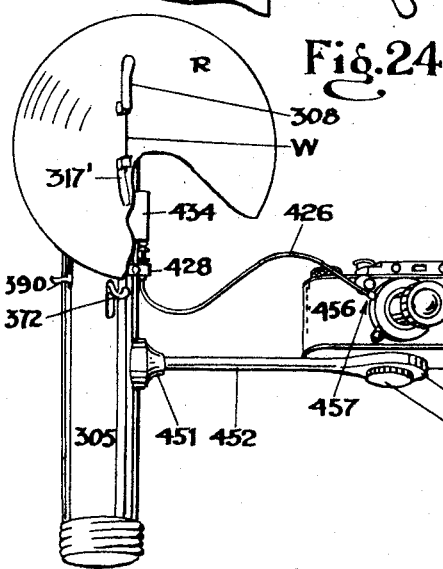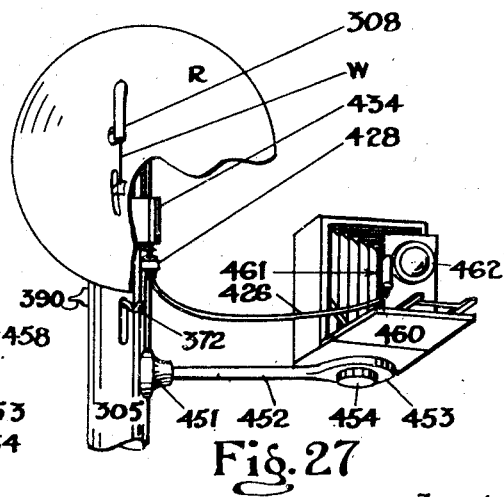

Patented Feb. 26, 1946

2,395,500

UNITED STATES PATENT OFFICE 2,395,500

REPEATING FLASH AND SYNCHRONIZING APPARATUS

Carl Louis Oswald, New York, N. Y., assignor to himself, as trustee for himself and Warren Dunham Foster, Eustis, Fla.

Application June 19, 1943, Serial No. 491,542

38 Claims. (Cl. 240—2)

In its essence this invention may be said to be that of a repeating flash-light apparatus or flash-gun to illuminate objects to be photographed. It relates to a device which automatically and repetitiously and in immediate succession produces a large number of flashes and, if used for photographic purposes, preferably at the same time causes an exposure to be made upon a light sensitive film or the like which is disposed within a camera. After each such flash and exposure, my apparatus automatically advances ready for the next operation the material which is to be volatilized to produce the illumination of the object to be photographed and preferably also the film which is to be exposed to that object to record its image. To produce such flashes, my apparatus uses material which is characterized by a very small fraction of the weight and bulk of the flash bulbs ordinarily employed by photographers for such purposes.

The material which I employ to produce the flashes is preferably of such character that when volatilized following the application of an electrical current it produces illumination which is sufficient in quality and intensity for any exposure which a photographer reasonably desires. For convenience in this specification, I refer to this material as a "wire." But by this term I include material of many different characteristics and forms, all as I set out at greater length hereinafter and in a co-pending application to which I later refer.

Preferred mechanical embodiments of this invention consist of a mounting, a reflector supported by the mounting, two pairs of spaced jaws or clamps within or adjacent to the reflector between which a desired length of wire is firmly held in order to be volatilized, a carrier for the wire, and mechanism operated by movement of a trigger for automatically applying an electrical current to the length of wire thereby producing a flash and immediately thereafter replacing the wire with another charge ready for the next operation. Preferably the carrier and trigger-operated mechanism are disposed to the rear of the mirror, the wire passing therefrom through openings in the mirror and the jaws being supported and operated by connections which pass through openings in the mirror and engage the mechanism therebehind. I prefer to supply mechanism by means of which the space between these pairs of jaws and hence the length of wire delivered thereto may be automatically and jointly varied, thus making possible flashes of varying degrees of photographic effectiveness.

My flash-light apparatus is preferably but not necessarily synchronized with mechanism of a camera for operating a shutter thereof and in certain cases advancing a film therein. With such a device and camera, a photographer may take any reasonable number of pictures in immediate succession, each artificially illuminated. In fact he can take photographs at night as fast as he can pull a trigger within the limits of the film capacity of his camera.

My flash-gun is intended for many and in fact the majority of purposes to supplant the present use of flash bulbs. In recent years almost all flash-light exposures have been produced by the use of such bulbs.

The chief limiting elements in the present use of flash bulbs are the trouble and delay (and danger of burns or fire) in changing those bulbs in order to make successive exposures, the relatively great bulk, weight and fragility of flash bulbs, and their high cost. My invention overcomes all of these disadvantages.

According to present common practice, separate bulbs are individually sealed in their holders for each exposure. Thereupon an electric current is applied to a bulb and the material therewithin is burned. Then the operator removes the bulb from its holder, being careful not to burn his fingers for it is extremely hot at that time, inserts another, and so proceeds to take another picture. He also must use great care in disposing of the used bulb for its heat is such that it can easily cause a fire. If an automatic ejector is used, the hot bulb is thrown out of the flash-gun, an operation which does not solve the problem of the disposition of the hot bulb and presents a new problem of breakage of the hot bulb when it strikes the floor or whatever may be in its path. Alternately, holders have been proposed which accommodate a plurality of bulbs and also composite bulbs having a plurality of single flashing units built within each. Also, magazine devices, of considerable complexity and bulk, have been proposed in which a few bulbs are successively advanced to firing position. Such expedients, however, have only slightly reduced the time, danger and trouble which are required for successive exposures. Moreover, they have only slightly, if at all, lessened the bulk and weight of the material which a photographer has been required to carry in order to make pictures requiring artificial illumination.

Conventional flash bulbs even of the smallest size are difficult to transport, especially in quantity, and are fragile enough to require careful handling. The so-called "peanut" bulb of small size which is most generally used by news and amateur photographers is ordinarily packed in cartons containing 120 bulbs. Each of these cartons weighs when packed about five pounds and measures roughly 17 x 8 x 7 inches. Fifty-six thousand flash bulbs of this size when packed for shipment will weigh approximately one ton and will require approximately 255 cubic feet of shipping space. One pound of wire such as I have successfully used in the practice of my invention, however, will produce a minimum of 56,000 flashes—the same number. When cut in small lengths of say ten feet and spooled for quick application to my device they need not weigh over five pounds and will bulk less than one cubic foot. It will thus be seen that by a conservative estimate the material to be employed to produce artificially illuminated exposures under my system requires less than one two-hundredth part of the weight and bulk of that which is required by the smallest type of flash bulb in common use.

A second difficulty of almost equal importance, at least for the amateur, is the high cost of these bulbs. Wire such as is satisfactory for my use costs, when spooled ready for use, a small fraction of the cost of flash bulbs which will give a similar number of exposures.

In recent years, the tendency in the development of photographic equipment, particularly for amateur and news use, has been in the direction of small sizes and light weight. Cameras in common use today weigh a mere fraction of those of even ten years ago. Yet a photographer who can carry his camera literally in his pocket is often forced to hire an assistant to carry heavy and bulky packages of flash bulbs. Enough of my material for from 80 to 120 exposures is carried upon a reel of much less bulk and weight than that used for a typewriter ribbon. The bulk and difficulty of transportation of flash bulbs probably form the limitation which most severely curtails the freedom and range of movement of a working (or amateur) photographer.

In preferred forms of the invention the lengths of wire to be volatized can be varied at will, thus making it possible for a photographer to increase or decrease the intensity of the flash in order to meet varying requirements. For example, when the camera and flash-gun are combined in a synchronized unit, as is preferred, more light is needed to provide adequate illumination at 15 feet from the subject than would be needed in a close-up at 6 feet or less. With the flash bulbs which are presently in use, the photographer opens the diaphragm of the lens which is a somewhat delicate and time consuming operation, to compensate for the lesser amount of light on the object at the greater distance and vice versa. With my device, however, the photographer need not change the diaphragm of the lens, but merely set the device so as to volatilize whatever length of wire he calculates will best illuminate the subject at the distance at which each picture is to be taken. Also as he replaces a film of one sensitivity with that of another he can make the necessary adjustments in the flashing device by merely changing the length of wire and can leave the diaphragm setting untouched.

A related advantage from the use of my system arises from the easy interchangeability of carriers carrying wires which on volatilization produce different spectral characteristics. Also, one carrier supports wire which gives a flash of ordinary intensity while others carry material which gives much greater illumination. The lengths of each of these respective wires which are suitable for a given purpose generally differ; but the mechanism of my device is such that instant and automatic adjustment can be so made that the instrument delivers the amount of each material which is proper for the use in hand.

This invention is designed especially to meet many of the ordinary needs of news cameramen and others who wish to make close-ups or the like of a more or less informal character and require speed in handling their equipment and demand a minimum of bulk, trouble and expense. It is true that for some of the more specialized types of photography in which bulk and difficulty of manipulation are not such important disadvantages, a photographer may well continue to use the larger and more specialized types of flash bulbs. My invention, by the use of special wires, is equally well adapted for many of such specialized uses, but in many such cases since the photographs are generally to be made within a studio or other place where conditions may be well controlled and are generally few in number, conventional flash bulbs may often be used to advantage.

As I have pointed out hereinbefore, I have employed and shall employ the term "wire" generically and to cover a large variety of materials in many different forms. In this application I am describing the material which I use and the elecrical currents which I apply thereto only to that brief extent which is necessary for an understanding of the structure described and claimed herein.

The substance which is volatilized to produce the flash may be a wire, a thin ribbon, a composite fabric woven of many metallic strands, a fabric woven of organic and metallic strands, or minute separate wires suitably supported, or the like. Such organic threads may be used to carry color controlling chemicals or to give desired physical characteristics or both. This wire or ribbon or the like may be made by conventional means such as drawing or under certain conditions by powder metallurgy, lamination, the deposition of a second metal upon a wire or ribbon already produced, or by a combination of any of the foregoing. Such deposition may be chemical or physical, as by condensation, plating, immersion or other suitable means. It should be understood that the above statement is for purposes of illustration only.

Thus it will be understood that in the claims when I use the term "wire," I mean to include all other forms of filamented or strip or other similar material which can be volatilized for this purpose.

An illustration of the practice of my invention in what is probably its most simple form includes use of aluminum wire having a diameter of about .013 inch (28 gauge Brown & Sharpe) and a length of from 1 inch to 1½ inches. Volatilization of one inch of this wire within approximately one-fiftieth of a second under the impact of direct current of 8 amperes at 110 volts in a totally dark room makes pictures on a film having a daylight Weston rating of 50. It produces negatives of better than average density with the flash set over 9 feet from the subject and with the camera lens set at an aperture of F: 4.5. With such a flash, background detail at a distance of 15 feet from the flash is well shown.

Other variables include both the amperage and the voltage which are applied to a wire in order to volatize it. The applied voltage is critical in that it determines color temperature and speed of the flash. It will, of course, be understood by those who are skilled in the electrical arts that the diameter and length of the substance which is volatilized, as well as the characteristics of that substance, including conductivity and resistance, determine the quality for photographic purposes of the flash which results from volatilization. Generally speaking, the material to be chosen is that which for a given length and diameter at a given electrical input will yield the highest photographic effectiveness. It is the couple of length and diameter which is critical.

It should be particularly pointed out that the practice of this invention depends upon the volatilization of the wire which is employed and not upon its combustion. According to this invention, illumination is provided by a physical, not a chemical, change of form. Volatilization requires heat, which I supply electrically. Combustion, however, requires heat to initiate it and then generally by oxidation continues the reaction to completion and in so doing produces heat. This distinction is one basis for the relatively greater safety of my device. Flash bulbs depend upon combustion, ordinarily by the oxidation of fine metallic wires or thin films in an oxygen atmosphere within a glass or other similar envelope. Combustion produces heat; volatilization absorbs heat. A flash bulb may be readily ignited by external heat. My wire cannot be ignited by external heat. Great external heat, such as that resulting from an accident, might cause it to melt, but not to burn, for it is not subject to combustion.

As an example of the relative safety of the two systems, it may be said that many photographers are painfully familiar with the serious burns which they have suffered either in removing a flash lamp from its holder before it has cooled sufficiently to be handled without gloves, or, in those instances in which the bulbs have been fired prematurely. In my own early experiments I have repeatedly inadvertently caused my wire to flash prematurely while my hands have been about it, and have suffered not even momentary inconvenience. Photographers and their associates also remember the many cases in which used bulbs when placed in waste-paper baskets or the like, before they have been cooled, have caused fires.

Another great advantage of a material which volatilizes in comparison with one which burns is that in volatilization the material is completely—or, practically speaking, completely—dissipated, while a considerable amount of ash generally remains after any common type of combustion. In my flash-gun, for example, while there may be a very slight amount of ash owing to imperfect volatilization, as is occasionally likely under working conditions, this residue from a single flash is too small even to be noticeable. What little there is, is cool. A small length of wire which remains in the lower jaw after each flash is, of course, entirely harmless and unobjectionable. A used flash bulb, however, must in one way or another be disposed of.

A result of the above advantageous characteristic is that with volatilization a reflector which cooperates with a wire being flashed remains clear and optically undamaged. If, however, I were to employ a material which burns instead of volatilizes, a reflector associated with it would quickly become cloudy, pitted or otherwise unfit for its purpose. In fact, reflectors which have been employed with my device show no reduction in optical efficiency.

It should be understood, however, that for certain specialized purposes, such, for example, as controlling the color of the emitted light, materials characterized by rapid combustion may be combined if desired with those which volatilize. Also, although ordinarily undesirable for photography, my apparatus may be used for handling materials which are subject to rapid combustion in air rather than to volatilization.

Another advantage of my invention in comparison with the use of flash bulbs is that I produce a line source of light. This highly concentrated light can be focused easily and with high optical efficiency. A conventional flash bulb cannot be effectively focused, if at all, because the flash bulb produces its light over a relatively large area. The shape and size of the source of light which I employ make it possible, by relative movement between the line source and the focal point of the reflector, to produce parallel convergent or divergent light, thereby obtaining the advantages of each for the particular lighting problem in hand. Such an arrangement is either impossible or impractical with a flash bulb.

In considering my invention, both alone and in relation to conventional flash bulbs, it should be pointed out that I use the volatilization of wire as the sole source of illumination. In the prior art, electric currents have been applied to wires and ribbons in order to ignite bodies of flash powder, generally magnesium. Such devices are comparable to a conventional flash bulb without the advantages which undoubtedly result from the placing of the material which is burned within an envelope wherein a necessary atmosphere can be created. Also, the carefully controlled intermittent volatilization of wire by my apparatus should be carefully distinguished from early projects for advancing magnesium ribbon or the like so that it can be continuously burned to produce illumination.

A repeating flash-gun embodying this invention if of horizontal type may consist of a central or transverse supporting body upon one or a forward end of which is supported a reflector and from the other or rearward end of which depends a casing which serves both as a hand grip and as a housing for batteries. Within the periphery of the reflector and adjacent thereto are placed two sets of jaws spaced from each other each set comprising a fixed jaw and a jaw movable relatively thereto and one of these sets of jaws preferably being bodily movable relatively to the other so that different lengths of wire may be accommodated. Above and to the rear of the reflector, I provide a housing to accommodate a reel or carrier of wire, which is directed downwardly and forwardly therefrom and between the jaws. Adjacent the supporting structure at the opposite end of the transverse portion is a trigger. Mechanism connecting the trigger and the jaws is such that the first portion of the movement of the trigger closes a circuit to the length of the wire which extends between the pairs of jaws thereby producing the flash. Continued movement of the trigger opens the jaws and advances a new charge of wire between them. Release of the trigger closes the jaws upon the new charge ready for a second operation. The electrical and mechanical timing mechanisms are such that the circuit including the length of wire between the jaws is closed merely for the instant of flash and otherwise always remains open.

I provide a simple control plate the movement of which to any one of several positions changes the gap between the jaws and automatically and appropriately changes the lengths of the successive charges of wire which are advanced.

These jaws and their construction and arrangement form an important element of this invention. The purpose of the mechanism which I thus characterize in this specification and the claims appended thereto is to provide structures which positively hold a stretch of wire in a predetermined position, each end of this wire so held terminating in a clamp which provides a positive, dependable and unchanging electrical contact. The efficiency of this apparatus depends upon the volatilization of a stretch of wire by the impact of an electric current. This volatilization will not take place with certainty, efficiency and uniformity of timing and lumen and spectral output unless each end of this length of wire is firmly clamped to a member which forms a part of a circuit. Also, lack of such contact may cause the wire to melt and not volatilize because its temperature is raised slowly. The wire upon volatilization is not only fixed but motionless. Movement produces electrical, physical and optical problems which in turn may produce unpredictable results. It also should be noted that the wire is advanced to the jaws without contact with parts which tend to kink or otherwise deform it, since deformation changes electrical characteristics and hence light output and makes for uncertainty and lack of uniformity of results.

As a matter of convenience, I use the term "jaw" to indicate one member of such a clamp or positive holding device. I am showing each set of jaws as comprising only two members, one of which in a preferred form of this invention has a right angled extension toward the other jaw of said pair, this construction resulting in a three-sided enclosure for the wire. I include within the scope of my claims, however, any clamping structure which has two members or more than two members and in which one member or more members are movable in relation to another or the others. For convenience of construction, as shown in the drawings appended hereto, I show only one jaw connected with the electrical circuit, but it will be understood that if desired both may be so connected.

I prefer operatively to connect the trigger with the shutter opening and film advancing device of a camera so that as the trigger is pulled the exposure is made and in cameras which are suitable a new charge of wire placed in position for use simultaneously with the advance of fresh film in the position for exposure.

In another preferred form of my invention the parts are disposed in vertical arrangement, a reflector being carried by a vertical casing which houses both the operating mechanism and the batteries. Principles of operation in each case are closely similar.

In every exemplification of this invention, timing is most important. After the pairs of jaws have been set to their proper spacing and the wire-advancing mechanism correspondingly and automatically adjusted, if the apparatus in question includes this important feature of my invention, and the jaws initially clamped shut on the stretch of wire between the two pairs, a complete cycle of operation may well include the following steps:

1. The shutter of a camera is opened;
2. The switch of the flash-light apparatus is closed thereby volatilizing the wire and making the exposure;
3. The electrical circuit is opened;
4. The shutter is closed;
5. The jaws are opened;
6. A fresh length of wire is placed in position;
7. In cameras having timed film-advancing mechanism a fresh film is put in position;
8. The jaws are closed.

If desired, the shutter may be opened and closed during instead of before and after the flash. The time at which fresh film is advanced—and, in fact, whether or not it is advanced—depends upon the structure of the camera which is used with this device.

It is, of course, understood that the complete cycle, as stated above, preferably takes place under the control of a single actuating member or trigger. The entire operation following a single movement of this trigger is automatic. The timing is entirely predetermined.

An important element of my invention lies in automatic electrical switching mechanism. The appropriate circuits are closed only for the instant when the flash is provided, and immediately thereafter are automatically opened and remain open throughout the entire succeeding cycle of operation. To accomplish such ends, I provide novel switching mechanism by which the circuits are closed by a predetermined movement of the control mechanism in one direction while they remain open during the completion of this movement and during the entire operation of the subsequent movement in the other direction.

Among the objects of my invention is the provision of a device for artificially illuminating a subject to be photographed by simple, compact and inexpensive apparatus which requires material which is relatively inexpensive and has very much less bulk and weight than the flash bulbs ordinarily employed for such purposes. Other objects are to provide improved and automatic mechanism for artificially illuminating such subjects. A further object is the provision of apparatus which can readily and instantly be adjusted to apply to such a subject widely varying degrees of illumination and in which flash materials of differing photographic effectiveness and purposes may be quickly substituted. A still further object is the provision of apparatus which makes it possible to take a long succession of artificially illuminated photographs with extreme rapidity.

Although I have ilustrated my invention as applied to photography, it will be understood that it may be employed in other arts, especially those in which the production of an intermittent light of relatively high intensity is wanted. Such use is particularly advantageous for producing such light of different colors without the use of light-consuming filters. One illustration only of use outside of photography is for signalling.

Another object of the invention is to carry out all of the foregoing purposes in such manner that it is possible not only to operate a camera shutter in proper timed relation to such artificial illumination but also to advance fresh film to the point of exposure as fresh flash material is advanced to the point of volatilization.

Other objects, advantages and characteristics of this invention will be evident from the following portion of this specification, the accompanying drawings and the subjoined claims. Although I am showing preferred forms only of my invention for purposes of illustration it will be understood that changes can readily be made without departing from the scope of my broader claims and the spirit of my invention.

In the drawings:

Figure 1 is a perspective view of a preferred pistol-like or horizontal form of the invention.

Figure 2 is an elevational view largely broken away but partly in section and corresponding to Figure 1.

Figure 3 is a section taken on the line 3—3 of Figure 2 and looking in the direction of the arrows.

Figure 4 is a fragmentary view of a portion of the structure of Figure 2.

Figure 5 is a view partly in section taken on the line 5—5 of Figure 2 and looking in the direction of the arrows.

Figure 6 is a section taken on the line 6—6 of Figure 2 looking in the direction of the arrows.

Figure 7 is a view taken on the line 7—7 of Figure 2 and looking in the direction of the arrows.

Figure 8 is a side elevational view partly broken away of a construction of an upper or relatively fixed pair of jaws.

Figure 9 is a sectional view showing a form of mounting a jaw-moving member alternative to that of Figure 2.

Figures 10 and 11 correspond to Figure 9 and show other preferred forms of such construction.

Figure 12 is a sectional fragmentary view of a switch alternative to that shown in Figure 2. It is taken on the line 12—12 of Figure 13 looking in the direction of the arrows.

Figure 13 is a view taken on the line 13—13 of Figure 12 and looking in the direction of the arrows.

Figure 14 is a fragmentary view of a second switch structure alternative to that of Figure 2 or 12 and 13.

Figure 15 is a view taken on the line 15—15 of Figure 14 and looking in the direction of the arrows.

Figure 16 is a view largely in section corresponding to the rightward portion of Figure 2 and showing an alternative structure of jaws.

Figure 17 is an exterior elevation of a vertical model by which the invention may be practiced.

Figure 17—a is a detailed view of certain details of a synchronizing device for the structure of Figures 17 and 18.

Figure 18 is a view largely in section corresponding to Figure 17.

Figure 19 is a view partly in section of a switch mechanism which may be employed in the practice of the form of the invention shown in Figure 18.

Figure 20 is a sectional view upon the line 20—20 of Figure 19 and looking in the direction of the arrows.

Figure 21 is a view of a mechanism alternative to that shown in Figure 2 for moving a wire carrier of a horizontal exemplification of the invention.

Figure 22 is an enlarged view partly in section of details of a synchronizing mechanism employed in the practice of the horizontal type of the invention as shown in Figures 1, 2, 24 and 25.

Figure 23 is a view largely in section of the structure of Figures 22 and 24.

Figure 24 is an elevation of the synchronizing mechanism of Figure 22.

Figure 25 is a perspective view of the synchronizing and flashing mechanism of Figures 1 and 2 in combination with a camera of a so-called view type.

Figure 26 is a perspective view of synchronizing and flashing device of the vertical type of Figures 17 and 18 in combination with a camera of the miniature type.

Figure 27 corresponds to Figure 26 but shows a camera of the view type.

In the following portion of this specification and in the claims, the words "left" and "right" and their derivatives refer to a part or device in question as viewed in the drawings, except in such cases as two figures make possible a misunderstanding. In such instances the element is defined in terms of a figure. The terms "upper" and "lower" refer both to the part or device under description as viewed in the drawings and also as positioned when the flash-gun is in normal position for use. The terms "forward" and the like refer to the direction (to the right in the drawings) toward which light is projected from a flash, and "to the rear" or the like, to the contrary direction.

A horizontal form of this invention which roughly resembles a pistol may be best understood from Figures 1, 2 and 6. The fundamentals of such a structure may comprise a mirror M, a carrier C for wire W disposed within a housing H, an irregularly shaped transverse support T, and a battery casing B, all of these parts being disposed behind or to the rear of the mirror. A forward or rightward portion of the transverse support T carries the mirror M while a rear portion either supports or is extended into the battery casing B. This casing is shown as containing only one cell, but in many instances a larger space is provided so that a plurality may be used.

As previously pointed out in the introductory portion of this specification, the jaws by which successive lengths of the wire W are clamped into position comprise two pairs, each pair in turn comprising one jaw which is movable in relation to the other and one which is relatively fixed and one of the pairs being bodily and vertically movable in relation to the other. Such bodily movement is for the purpose of selectively accommodating different lengths of wire, thus giving flashes differing in actinic effectiveness or other characteristics, and the horizontal movement of one member of each jaw relative to its mate is for the reception of additional lengths of fresh wire which are needed after each use of the device.

As best shown in Figures 2 and 8, an upper or non-adjustable pair of jaws may consist of a fixed member 21 shown as made of electrically non-conductive material disposed to the outer side of the device and to the right and a member 22 movable relatively thereto disposed toward the left or inner side. As is clearly shown in Figure 7, the interior or holding portions of each member of each of these jaws is knurled in order to give a greater grip upon the wire. A relatively wide supporting strap 23 for fixed jaw 21 forms a third side for the upper jaw structure thus guiding the wire from three sides instead of merely two. A similar flat strap 24 supports the inner or movable jaw 22 and is attached to the previously described strap 23 as by a bolt 25 working in a slot 26. As will be readily apparent this construction makes it possible for the structure comprising movable jaw 22 and its support 24 to move upon strap 23 while it is supported thereby. The alternative construction of Figures 9, 10 and 11 will later be described. As will be readily seen from Figures 2 and 8, the upper portions of lips of jaws 21 and 22 are flared as at 27 and 28 respectively more readily to receive the wire as it is moved forwardly after each volatilization. Interposed between jaw 22 and its support 24 is an insulating block 29 (Figure 8). The structure supporting and controlling this upper pair or set of jaws extends through an opening 30 in mirror M.

The lower pair of jaws, which are similar in construction, will next be described and thereafter the mechanism by which one jaw of each pair may be moved relatively to the other and both jaws of the adjustable or lower pair bodily moved relatively to the upper pair.

The lower or bodily adjustable pair of jaws may consist of a relatively fixed jaw 31 shown as made of electrically non-conductive material and a relatively movable jaw 32 each with flared lips as previously described. Movable jaw 31 is supported upon a relatively wide strap 33 upon which is mounted a narrower strap 34 fastened thereto as by bolts 35 operating in a slot 36 whereby strap 34 may slide upon and relatively to strap 33, such sliding movement to the left serving to open the jaws. As shown in Figure 6, an L-shaped insulating block 37 electrically isolates jaw 32 from the remainder of the mechanism. Reference is made to an alternative construction of jaws shown in Figure 16 and hereinafter described.

A construction similar to that above described for the upper pair of jaws is provided for the lower pair of jaws so that one jaw of each pair can be moved relatively to the other as a jaw of the upper pair is moved. This construction provides, however, for bodily movement of the lower pair as a unit and away from the upper pair.

Strap 34 is operatively connected to strap 24 previously described and movable relatively thereto and therewith, as will be seen from Figures 2 and 3. It is L-shaped in elevation and has an upwardly extending long arm which in turn as by bolts 38 operating in slots 39 is mounted upon a depending strap 40 for movement therewith and relatively thereto. As best shown in Figure 2, strap 40 projects downwardly from the junction of strap 24, upon which the movable section 22 of the upper jaws is mounted, and a long operating extension 42 of strap 24 extends to the left from this junction throughout the supporting transverse housing structure T. This operating extension is guided by supports 43 mounted upon the interior surface of the main hollow transverse support T. It will be readily understood that movement of straps 42—40—24 will simultaneously move jaws 22 and 32 away from and toward their mates 21 and 31 respectively.

As previously pointed out, jaws 31—32 are subject to joint bodily movement upwardly, as shown in Figures 1 and 2, to reduce the gap between them and jaws 21—22, thus accommodating shorter lengths of wire. Such movement is made possible by the elongation of the opening through which these lower jaws are supported and operated into a slot 45. Simple mechanism to accomplish this result will likewise be clear from a consideration of Figures 2, 5 and 6 and the portion of this description which follows.

Operating strap 33, upon which is directly mounted relatively fixed lower jaw 31, likewise is L-shaped with its short upward extension 46 guided by a strap 47. From the foregoing description, it will be readily understood that as strap 33 is bodily moved upwardly the pair of jaws 31—32 as a unit likewise will move upwardly toward the pair made up of jaws 21—22, the upwardly extending portion of strap 34 sliding relatively to and upon downwardly extending strap 40. To produce such movement, a series of connected links 48, 49 and 50 is supplied. Link 48 is attached as by a pin 52 to the upward extension or leg 46 of strap 33 and by a pin 53 to strap 49 which is pivoted upon a pin 54. A spring 55 tends to maintain the elements of this control structure in place. A pin and slot connection 56 joins links 49 and 50, link 50 being pivotally mounted upon a pin 57.

In timed relation to the above-described opening of the jaws following each flash and as previously stated, carrier C is rotated to advance a length of wire ready for the next flash. After this wire is advanced, the jaws are closed upon it and the cycle of operations may be continued indefinitely. The length of the wire which is advanced is predeterminately varied in accordance with the separation between the two jaws of each pair. One mechanism to accomplish this purpose is shown in Figures 2 and 3 and described immediately below, and another is shown in Figure 21 and later described.

Carrier C, as is best shown in Figure 3 is mounted for rotation with a spindle 59 which is positioned in housing H which is disposed above and behind mirror M. A hinged cover 60 permits a user to place the carrier upon this spindle. Loosely mounted upon a portion of spindle 59 adjacent the side of the housing opposite door 60 are a ratchet wheel 61 and a relatively large gear 62 which are fastened together for joint movement. Gear 62 meshes with a pinion 63 revoluble with a gear 64 upon a shaft 65. Gear 64 in turn meshes with gear 67 which is fastened to and turns spindle or shaft 59. Thus it will be seen that rotation of ratchet wheel 61 moves carrier C but at an accelerated rate.

Every time the pairs of jaws 21—22 and 31—32 are opened after each firing of a flash but before they are again closed, ratchet wheel 61 and hence carrier C must be revolved to advance a portion of the wire equal to the distance at which the pairs of jaws are then spaced from each other. To this end, strap 42 has a laterally offset upward extension 69 which forms a support for a dog 70 pivoted thereon at 71 and by a spring 72 held against a stop 73. The formations spoken of as extensions 40 and 69 of strap 42 and also strap 24 and strap 42 itself may be independent elements but preferably are stamped from one piece.

It will be readily understood that the extent of the horizontal movement of dog 70 will determine the number of teeth engaged thereby and hence the extent of rotational movement of ratchet wheel 61 and consequently carrier C.

By reason of the above construction, it will be understood that when operating strap 42 is moved to the left, the ratchet wheel 61 and hence carrier C will be revolved and a portion of wire W will be advanced by engagement of dog 70 with a square face of the ratchet wheel. Contrary movement of strap 42, however, will be without effect upon carrier C since the inclined face of dog 70, which is then free to move upon its impact with ratchet wheel 61, will slip over the correspondingly inclined face of the teeth of ratchet wheel 61, spring 72 returning the dog to an upright position after the jaws have been again closed.

If desired, a detent, not shown, frictionally held against spindle 59 may be added to prevent unwanted unwinding of carrier C.

Reference is made to an alternative construction shown in Figure 21 (Sheet Three) and described hereinafter.

In order to remove from the wire whatever slight backward bend may be given it by its having been coiled upon the reel and to deliver it substantially straight to the jaws, straightening rollers 75 and a straightening and protective tube 76 if desired lined with velvet or similar substance 77 are supplied.

Since the wire which I employ is not combustible, no precautions need be taken in connection with the above-described supply of fresh material. There is no possibility that the heat which is momentarily electrically induced in order to volatilize the length of wire between the jaws could be communicated to the supply upon the reel or the stretch disposed between the reel and the point of volatilization. In fact, even if by any chance the full force of the battery or of a house current were applied to the material which is in readiness for use, it would not be affected in any way. The accidental application of high external heat might conceivably melt the wire but it would not cause fire.

Horizontal movement of the jaw-opening structure previously described and hence the advance of the wire is accomplished primarily by a trigger 80 movable in a straight line upon headed pins 81 working within a slot 82 and connected with strap 42 by a pin or connective or operating member 83 working in a slot 84 in order to provide lost motion. It will be readily understood from Figure 2 that on account of the above described connective mechanism movement of the trigger 80 toward battery casing B after a slight period of dwell to provide for the flashing of the wire will move straps 42—24—40—36 to the left, thus opening the jaws, and will also advance the length of wire necessary for the next flash. Contrary movement to the right when pressure upon trigger 80 is released is afforded by moving means in the form of a compression spring 86 which extends between an open-ended housing 87 formed upon an interior portion of the transverse support T and a strut 88 extending upwardly from strap 42.

It is necessary that before the jaws are opened the stretch of wire between jaws 21—22 and 31—32 be volatilized in order to provide the necessary flash. In order automatically to accomplish this purpose a switch is operated by the first or idle portion of the movement of trigger 80. As shown in Figure 2, a dog 91 made of electrically non-conducting material is pivoted at 92 upon the trigger and held in place by a spring 93 against a detent 94. As trigger 80 is moved to the left, the downwardly projecting portion of dog 91 forces switch point 96, which is supported by a leaf spring 97 attached to an insulated block 98, against a similar switch point 99 thus making the circuit between the positive connection 101 of the battery 102 and a lead 103 which extends along contact straps 42 and 24 to and is directly connected with jaw 22. In the concluding operative portion of this movement, this dog 91 depresses switch elements 96—97 and slides over and beyond them, their resilient support causing them to spring back to the position shown in Figure 2 thereby promptly opening the circuit. It is, of course, understood that while the support for these switch points is sufficiently resilient to permit dog 91 to depress them to close the circuit, it is sufficiently rigid to move dog 91 upon its pivot 92 upon such return movement so that the circuit remains open. The other leg of this circuit comprises a lead 104 extending directly from jaw 32 to a negative terminal 106 of battery 102.

Throughout the foregoing portion of this specification this invention has been described for use in connection with batteries. It will be readily understood, however, that my flash units can readily be equipped for use with standard current of usual voltage where it is available in studios and homes. Such units may be equipped with either step-up or step-down transformers to secure greater or less voltage at the jaws so as to utilize to the best advantage the volatilization characteristics of the particular metal and gauge of wire which is selected. The battery model shown and described above in order to illustrate my invention may be fed with a battery or batteries in series of the radio B battery type or with special high voltage batteries to provide the 110 volt current which is necessary to volatilize certain types of wire although for many types, however, batteries of much less voltage are entirely satisfactory. In considering the electrical requirements of the device, it should be remembered that the drain is only momentary and necessarily intermittent. Volatilization of the wire which I have used which demands the greatest amount of current requires eight amperes at about one-fiftieth of a second. This drain is so small that a single battery gives excellent service over a reasonably long period of time.

The supporting and control structures previously and hereafter described may be of metal, largely in the form of stampings, or they may be of dielectric materials such as plastics of suitable characteristics.

The above-described structure is illustrated in the figures hereof with the pairs of jaws 21—22 and 31—32 removed from each other their maximum distance to accommodate a maximum length of wire thereby producing a flash of maximum intensity. As previously stated, jaws 31—32 may be bodily moved toward jaws 21—22 to accommodate shorter lengths of wire and when flashes of less intensity are desired. Such changes in spacing of the jaws must be accomplished by corresponding changes in the length of wire that is advanced after each flash. An irregularly shaped control plate 115, which the operator can move at will to a plurality of predetermined positions, both bodily moves one pair of jaws toward or away from the other and correspondingly determines the extent of rotation of the carrier, so that the amount of wire which is advanced is appropriate to the particular spacing of the jaws. This control plate is disposed to the left and spaced from the leftward end of control strap 42. It moves vertically upon pins 116 working in an oversize slot 117 under the influence of a compression spring 118 which tends to force this member upwardly. For purposes of illustration only three different stations are shown representing three different gaps between the jaws with corresponding degrees of rotation of carrier C. These stations are defined by three latches 119, 120 and 121 formed in the left side of control plate 115. Opposite each latch are appropriate markings, not shown, to indicate the gaps which are provided by the respective movements. These latches work against a detent 122 which conveniently may be carried in the upward and left-hand portion of the casing, all as best shown in Figure 2. Slot 117 in which pins 116 operate is slightly oversize so that it is possible for the operator to tilt the control plate sufficiently to disengage the various latches and detent 122 thus permitting spring 118 to advance control member 115 to the one of the three different stations which a user has then selected or, in the opposite direction, to permit him to depress the control member so that it is moved downwardly as described against the power of spring 118. By means of a pivot pin 125 working in a slot the previously described link 50 is joined to this control member. As control member 115 is elevated jaws 31—32 are likewise moved upwardly toward jaws 21—22 and vice versa. A tension spring 55 attached to link 49 (see Figure 2) assists in the upward movement of control member 115 when released and tends to maintain the linkage of control members 115, 50, 49, 48 and 46—33 in close relation.

It will be noted that the forward or rightward portion of control member 115 comprises a series of extensions or steps 130, 131 and 132 each offset from the other to the right. The leftward or rearward end of main control strap 42 is turned at right angles to form an abutting control surface 134 which engages the one of these steps 130, 131 or 132 which in accordance with the vertical movement of control member 115 is at that movement opposite thereto. It will thus be seen that the length of horizontal travel of strap 42 under the power of trigger 80 is dependent upon the vertical position of control member 115, such movement in turn through the coaction of dog 70 and ratchet wheel 61 determining the rotation of carrier C. Since as shown in the drawings, the pairs of jaws 31—32 and 21—22 are at their maximum separation, the travel of surface 134 before it abuts upon control member 115 is at its greatest. Hence the movement of ratchet 61 which is engaged by dog 70 and hence the amount of wire which is unreeled will be the maximum. As a user moves control member 115 upwardly jaws 31—32 will approach jaws 21—22 and the travel of control strap 42 and hence of rotational movement of carrier C and hence the length of wire delivered therefrom will be correspondingly decreased. Although three steps and stations are presented for purposes of illustration only, any practicable and desirable number may be employed.

Although several alternative details of construction remain to be described, the foregoing portion of this specification covers a preferred form of practicing this invention in those cases in which it is applied to a horizontal model. To review the operation: The user pulls trigger 80 and a circuit to that portion of wire W between the jaws is closed and the wire flashed. Continued movement of the trigger opens the jaws and rotates carrier C to advance flash wire ready for the next picture and its release causes the jaws to close upon the freshly inserted wire. The electrical arrangements are such that the circuit to the jaws is maintained open except during that brief moment at which the wire is being volatilized. Manual movement of control plate 115 is effective both to change the spacing of the pairs of jaws as desired and to set rotation of carrier C so that a length of wire equal to the selected spacing of the jaws will be advanced.

The constructions of Figures 9, 10 and 11 may be substituted for the simple straps one riding upon the other in the manner illustrated in Figures 2 and 6 and described above.

Figure 9 shows a strap 151 with angular edges 152 supported within an irregularly shaped channeled member having a base portion 154 and upstanding side portions 155 which are inclined inwardly to an extent equal to the angular configuration of the edges 152 of inner strap 151. It will thus be understood that strap 151 slides within member 154 and when used in the construction shown in Figures 2 and 6 moves bodily therewith.

In Figure 10 a squared inner strap 161 is shown completely enclosed within a quadrilateral structure 162.

Figure 11 shows a cylindrical rod 165 sliding within a cylinder 166.

It will be readily understood that any of the above variations may be employed as desired in place of such combinations as strap 34 which supports strap 33 by bolts 35 operating through openings 36 or the L-shaped extension of strap 37 working upon the downward extension 40 and holding it by bolts 38 operating through openings 39.

Alternatively to any of the constructions described above, simple toothed racks connected to each other by gears may be used.

Figures 12 to 15 inclusive show switch constructions which may be used alternatively to that of Figure 2. The importance of these switches will be recognized.

As can be seen in Figures 12 and 13, a switch housing 169 may be mounted in any convenient manner not shown upon an appropriate portion of the transverse housing T. A movable post 170, mounted upon a right angled extension 171 of the relatively wide portion of trigger 80 may take the place of dog 91 of Figure 2. A contact pin 172 is mounted within a slot cut within this post. A compression spring 173, which is placed within a bore in the pin extending beyond the slot and into contact with a screw 174 to which wire 103 may be attached, bears against the pin and holds it against the floor of housing 169. This floor is formed of an insulating block 176 centrally within which a conducting member 177 is placed which by a lead 178 is connected with the positive pole 101 of battery 102. As post 170 is moved to the left as shown in Figure 13 as the trigger is pressed to produce the flash, this contact member 172 presses against contact plate 177 and completes the circuit. It then engages the under surface of a leaf spring 181 mounted upon an insulating block 182 within housing 175 and finally passes over the leftward end thereof as seen in Figure 13. Later movement of post 171 to the right as viewed in Figure 13 as trigger 81 is released causes contact pin 172 to ride upwardly upon spring 181 thus passing above contact plate 177 without making contact therewith and at the conclusion of this rightward movement taking the position shown in Figures 12 and 13. By reason of this construction it will be seen that the circuit to the flash wire is closed and then promptly opened, while fresh wire is being placed between the open jaws, and remains open while the jaws are being closed.

Another simple switch structure which accomplishes the same important result in a somewhat similar manner is shown in Figures 14 and 15. A post 190, likewise mounted upon a right angled extension of trigger 80 in place of dog 91, supports a contact member 192 which is in the form of a leaf spring and is connected with lead 103.

This structure extends within a housing 181. As post and contact member move to the left as shown in Figure 15, the contact member passes from engagement with insulating block 193 into engagement with contact plate 194, which is connected by a lead 195 to the positive pole 101 of battery 102, and, after having raised a second and guiding leaf spring 196 which is supported upon an insulating member 197, again comes to rest upon the block. Corresponding movement to the right as shown in Figure 15 will cause contact spring 192 to ride upwardly upon spring 196 until it passes completely thereover and snaps back into the position shown in Figures 14 and 15. Thus contact is made only upon the operative or leftward movement of the post, while the return of the trigger upon the opening of the jaws does not again close the firing circuit.

For the jaw structure previously described, that of Figure 16 may be substituted. There are two main differences between this alternative mechanism and that which has already been described and is illustrated in Figures 2 and 8 of the drawings. In the structure of Figure 16, the immovable jaw of the upper pair is formed integrally with the lower end of a tube which directs the wire from a carrier C to its operative position between the jaws. Also, one jaw of each pair consists of a pointed wire-engaging portion and the other has a cooperating groove into which the pointed portion forces the wire when the jaws are closed. The jaw structure previously described clamps the wire into firing position, but the mechanism of Figure 16 makes this contact even more firm and positive.

Wire W is led from a carrier not shown through an opening in the mirror between straightening and guiding rollers 201 and into a tube which includes an inner portion 202 and an outer portion 203. The outer portion includes a relatively fixed jaw 204 and a right angled supporting extension 205 which at 206 is fastened to the rear of a mirror M'. As in the structure previously described, a jaw 207 movable relatively to jaw 204 is mounted upon but insulated from a strap 208 which generally corresponds to strap 24 previously illustrated and is mounted upon extension 205 by means of a bolt 209 working in a slot 210. The construction of the wire-engaging portion of these jaws is similar to that fully illustrated and later described in connection with the lower pair of jaws.

The lower set of jaws may consist of a fixed jaw 211 having a pointed wire-engaging protuberance 212 which cooperates with a semi-cylindrical opening or groove 213 formed within a relatively movable jaw 214 which by an insulating block 215 is mounted for movement with a strap 217, corresponding to strap 34 of Figure 2, by a bolt 218 which passes through a slot 219 in a strap 220, corresponding to strap 33 of Figure 2, upon which relatively fixed jaw member 211 is mounted. These supports for jaws 211—213 are bodily movable through a slot or opening 222 in the manner previously described in connection with Figure 2. The supporting and controlling structures of the upper jaws also operate through an opening 223 in mirror M'.

Likewise as previously stated, under certain conditions it may be desirable to advance wire W by a mechanism which is somewhat more simple than that of Figure 2 previously described. Such structure is illustrated in Figure 21 (Sheet 3).

A movement plate 233' is mounted adjacent control strap 42 for movement relatively thereto. A dog 226 is pivoted upon this plate at 227 under control of a light leaf-spring 228 tending to move the lower portion of the dog toward a detent 229. This dog engages a ratchet wheel 231 attached to a spindle 232 upon which a carrier C' may be mounted for rotation therewith. It will be readily understood that when dog 226 moves to the left, carrier C' will be rotated in a clock-wise direction to advance wire which is coiled thereupon. Movement of dog 226 in contrary or rightward direction will be without effect upon ratchet 231 and hence the wire since the dog will merely be rotated upon its pivot against the power of light spring 228. A frictional detent, not shown, may be provided if desired for spindle 232. It will, of course, be understood that the extent of the longitudinal movement of dog 226 will determine the degree of rotation of carrier C' and hence the amount of wire which is advanced.

In order to move this control plate and hence the carrier, a link 234 having bifurcated ends is mounted upon strap 42 as by pin 235 for movement therewith and relatively thereto. One and a shorter of these bifurcated ends co-acts with a pin 236 fixed in a wall of a housing for the carrier and the other and longer bifurcated end co-acts with a pin 237 attached to movement plate 233. It will thus be seen from Figure 21 that movement of control strap 42 to the left will operatively rotate carrier C' but to an extent greater than the movement of control strap 42 in view of the fact that the upper portion of link 234 is materially longer than the lower portion.

One—the horizontal—of the two major forms by a description of which I illustrate my flashlight has now been presented. Before describing a vertical exemplification, I shall point out preferred forms for mounting a camera upon my flash-gun. Any desired or conventional mounting may be employed, but the structure of Figures 1, 2 and 4, however, is preferred. This preference is based in part upon the fact that this structure makes it possible to change the photographic effectiveness of the flash by relative movement between the camera and the mirror. Another advantage of this arrangement is that it makes provision for a left-handed photographer. It will be noted from Figures 1, 2, 25, 26 and 27 that a self-locking swivel joint S is provided upon the top of the transverse housing T and a support L for the camera laterally extends therefrom. As shown in detail in Figure 2, this joint may consist of a base 240 attached to the top of housing T. A vertical portion 241 of a supporting rod is attached to or formed integrally with a disc 242 which is movable within an appropriate opening in base 240. A locking formation 243 by a pin 244 is attached to the supporting rod. To hold this locking formation and the structure which is supported thereby in the position to which they are moved, an annulus 245 is formed in the lower portion of this formation. A ball 246 held in place by a spring 247 mounted within an appropriate slot in the base retains this locking member in any position to which it has been manually moved but permits easy movement by an operator. Attached to a laterally extending section 248 of this rod is a camera supporting plate 249 into which a thumb screw 250 fits, this screw having a thread which is standard for the tripod-receiving sockets of American cameras so that any standard camera may be readily attached thereto.

As pointed out in the introductory portion of this specification, an important part of this invention is the provision of synchronizing and control mechanism whereby not only is a camera shutter opened in predetermined timed relation to a flash but also after each closing of the shutter, new material is automatically provided ready for a subsequent shutter opening and flash. Another important and related element of this invention is the provision of mechanism which makes certain that a shutter will not be opened until the material is in place to be volatilized and the flash produced and the apparatus properly set. When my invention is used with a camera in which the light-sensitive material is advanced concomitantly with the operation of the shutter (such, for example only, as the "Leica" or "Contax" or "Mercury"), I provide means for advancing fresh material to produce another flash in timed relation to the advance of fresh film, or the like, to be exposed thereby.

To accomplish the above result, a synchronizing device is preferably built into the flash-gun. As is best shown in Figures 22, 23 and 24, with reference, however, to Figures 1, 2, 25, 26 and 27, a housing 261 is formed upon the side of the transverse casing T adjacent trigger 80. To the left or to the rear thereof, is a clamp 262, likewise attached to the housing, for the reception of a cable release having a control button 263, a finger piece 264, and a Bowden wire or other transmission 265 which extends to a shutter 266 of a camera P having a lens 266'. This shutter may be of any conventional or desired type such, for one example only, as that described in United States Patent Number 1,831,791, dated November 10, 1931, to Joseph Mihalyi. It is of course understood that pressure upon button 263 opens the shutter which is thereafter automatically closed after an exposure of predetermined length. The camera preferably may be so designed, as is common in this art, that such movement of the shutter likewise advances a film ready for the next exposure. The finger piece of this cable release is placed within clamp 262 and held there by a set-screw 267 movable upon a threaded pin 268 having a head 269 movable within a slot cut in the side of housing T. It will be readily understood that the cable release within the clamp is subject to some slight adjustment and the position of the clamp itself may be adjutsed at will.

Cooperating with the button 263 of the cable release is an operating head 272 which is moved toward and operates the shutter release by the movement of trigger 80 of the flash gun. It will be readily understood, therefore, that the mechanism which flashes the wire operates the shutter. As is common with all synchronizers except those built into a particular camera, it is necessary to adjust the synchronizer to the camera which is to be used and also to the result which is desired.

The adjusting means described above make it possible either to open the shutter by means of the trigger 80 before the flash and close it after the flash or alternatively both to open and close the shutter during the flash, as, for example, when one wishes to photograph rapid motion. To assist in such adjustment, casing 261 has an indication 273 marked "Flash point" or with any other appropriate wording. An arrow 274 movable in slot 275 as trigger 80 and the synchronizing mechanism are operated cooperates with this indication.

The mechanism by which trigger 80 moves operating button 272 will be clear from Figures 22 and 23. To the forward or rightward end, a small plate 276 is attached to head 272 by a rod 277. Pivoted upon this plate at 278 is a dog 279 which is movable downwardly as viewed in Figure 22 by a leaf spring 280 carried by plate 276. This structure is urged to the right by a compression spring 281.

To move the structure described above to the left and hence to operate the camera shutter, a control plate 282 engages and moves dog 279. This control plate in turn is moved to the left as viewed in the drawings by a pin 283 which is attached to and moves with trigger 80. This pin passes through a cam slot 284 cut in the inner wall of housing 261 and is engaged by a bifurcated upstanding end of a control plate 285 which is mounted upon trigger 80. See Figure 2. A second pin 287 attached to and movable with control plate 282 likewise moves within cam slot 284 and guides the control plate. By reason of the above construction, it will be evident that movement of trigger 80 to the left toward the operating position will be effective for similarly moving control plate 282, dog 279 and control head 272, thereby opening the shutter of the camera. When the control plate 282 reaches the camming portion of the slot 284, however, dog 279 will be released therefrom and will ride over the top of the plate. Thereupon spring 281 aided by the spring tension of the shutter release will return dog 279 to the right. The shutter will close. Control member 282, which is fixedly attached to the trigger, moves idly in the remaining straight portion of slot 284 while the jaw-opening wire-replacing and jaw-closing operations are completed. After the trigger 80 has been moved to its extreme position and thereafter returned to the inoperative position, the various elements will return to the position shown in Figure 22 ready for a subsequent operation. It will be understood that in those cameras in which the closing of the shutter advances fresh film for the next exposure, as for one example only, a camera of a motion picture type equipped with a still picture control device, such as that marketed as a "Sept" or that of Barton Allen Proctor, Patent Number 1,944,033, dated January 16, 1934, this movement of film ready for a subsequent exposure will be substantially simultaneous with the advance of fresh wire into position.

Under some circumstances, a photographer may desire to terminate the operation of the flash-gun at the conclusion of a single exposure without placing a new charge of wire in position. To this end, a special latch is provided, as best shown in Figures 2 and 4. A latching pin 290 is mounted upon a leaf spring 291 which normally moves the latch into latching position. This leaf spring is mounted in a manner later described upon the underside of the top of the housing T. A detent structure 292 with a central opening and two inclined surfaces is formed in the top and to the extreme left of trigger 80. See Figure 2. When the latch is in the latching position, as trigger 80 is moved to the left to operate the flash-gun the latch will ride up upon the leftward inclined surface of the detent and drop into the central opening thereby locking the device. When the user wishes to resume operations, he merely raises the latch by grasping head 294 which is disposed upon the top of the housing. Thereupon he may continue the leftward movement of the trigger, thereby opening the jaws and replacing the wire which has just been flashed. It will, of course, be understood that the movement of the trigger 80 from the position shown in Figure 2 to that in which pin 290 drops within the detent 292 has flashed the wire.

Under usual conditions, however, the photographer will wish to hold this latch in inoperative position. To this end, spring 292 and the structure supported thereby is mounted for horizontal rotation upon a pin 298 which rotates upon a vertical axis. As shown in Figure 4, the detent is in its free position and will not engage the trigger structure as it is moved to the left. To move the latch into position to engage the trigger, it is rotated downwardly as viewed in Figure 4, so that a pointer 295 which is attached thereto coincides with a blocking indication indicated as 296. Alternatively, in a construction not shown, the detent may be attached to its head by a pin working in a cam slot so that by a revolution of the head as the user lifts the head, he cams the latch upwardly out of the range of the detent. Alternatively, the detent may be attached to its head by a screw thread which upon the rotation of the head will screw the latching pin upwardly out of the range of the detent.

Horizontal models illustrating the practice of this invention now have been fully described. In order further to exemplify the invention, vertical models as shown in Figures 17, 18, 19 and 20 now will be presented.

These models consist essentially of a vertical tube which at its upper portion carries a reflector and a carrier of wire. Behind the reflector and within the tube is situated the necessary control mechanism which includes an upwardly extending control structure the downward movement of which under the impulse of a trigger carries out all of the necessary operations of each cycle including the operation of a camera. Below the reflector is situated a casing for the batteries. Adjusting mechanism by which the spacing of the jaws may be changed and likewise the amount of wire fed for each operation is provided. Two pairs of jaws are disposed forwardly of the reflector and adjacent its surface, these jaws being supported and operated by mechanism which extends through appropriate openings in the reflector and the wire passing to the jaws through an opening therein.

Within a lower portion of vertical tube 305 are disposed a plurality of battery cells. An upper portion contains a control mechanism, which is about to be described, and supports a mirror R and houses a carrier 306 for wire W. Wire from this carrier is fed downwardly through a tube 308 which passes through an appropriate opening in mirror M. It may be lined with velvet or other similar material not shown. An outer and lower portion of this tube as at 309 forms a relatively fixed member of an upper jaw, the other and movable member of which 310 is mounted upon an insulating block 311 which is fixed to a control strap 312 which is a rightward extension of a main cam plate 313. This strap passes through an opening 314 in the mirror. Movement of this cam plate to the left will separate jaw 310 from jaw 309 preparatory to the placing of a new length of wire therebetween.

A lower pair comprises jaws 315 and 316. The supports for this pair pass through a slot 317' and are bodily movable toward and away from upper jaws 309—310. Jaw 316 is also movable from and toward jaw 315. Jaw 315 is mounted upon a lower jaw control plate in the form of an inverted L having a horizontal portion 317 and a vertical depending portion 318. Relatively movable jaw 316 is mounted upon an insulating block not shown which in turn is mounted upon a horizontal portion 320 of another and upper L-shaped jaw control plate which has a vertical upwardly extending portion 321. These two jaw control plates are mounted for vertical movement with each other and horizontal movement relative to each other by means of bolts 322 attached to horizontal portion 321 of the upper plate that is, the control plate for jaw 316, and working in a slot 323 in horizontal portion 317 of the lower plate that is, the control plate for jaw 315. Vertical portion 321 of the upper plate in turn is mounted upon main cam control plate 313 for horizontal movement therewith and vertical movement relatively thereto by means of bolts 325 attached to plate 313 and working in a slot 326 of vertical portion 321 of the upper jaw control plate. By reason of the above construction, it will be evident that movement of main cam control plate 313 in a horizontal direction will move jaw 310 in relation to jaw 309 and jaw 316 in relation to jaw 315, while movement of plate 317—318 will bodily and vertically move jaws 315—316 in relation to jaws 309—310.

To supply such horizontal movement, thereby opening and closing each set of jaws, a relatively long generally vertical main control strap 328 is provided. A main operating or control pin 329 projects in a direction normal to this strap from a leftward protuberance thereof and is movable within a cam slot 330 formed in main cam control plate 313. By reason of this construction, it will be evident that as control strap 328 is moved downwardly, it will cause the plate 313 to move to the left, thereby opening both sets of jaws.

While the jaws are thus opened and under the control of vertical control strap 328, the wire is advanced by rotation of carrier 306. To this end, mechanism similar in principle to that shown in Figure 21 may be provided.

A dog 332 pivoted as at 333 is mounted upon a wire control plate 334 which is vertically movable and is guided by coaction of a slot 335 therein and a guide 336 mounted upon the outer protective tube 305. A light leaf spring 338 tends to press this dog against a detent 339 upon plate 334. A disc 341 is attached to and movable with a spindle 342 upon which carrier 306 may be mounted for movement. A ratchet wheel 343 having teeth adapted for cooperation with dog 332 is attached to and rotates with disc 341. It will be seen, therefore, that downward movement of dog 332 will be effective to move carrier 306 in a clockwise direction and to advance the wire, while contrary movement will be without effect upon the carrier.

To provide such movement, a rocking arm 344 is pivotally connected as at 345 to control strap 328 for movement therewith. A short bifurcated end of this rocking arm coacts with a pin 346 fixed to a convenient portion of the inside of tube 305, while a bifurcation of a long arm of this lever coacts with a pin 348 placed in a lower portion of wire control plate 334. It will be seen, therefore, that downward movement of control strap 328 will move the wire control plate downwardly by a distance considerably greater than that of the movement of strap 328, thereby advancing an appropriate amount of wire.

Alternatively, gearing, as shown in Figures 2 and 3, may be employed.

A door not shown upon the side of the casing 305 permits access to spindle 342 and replacement of carriers.

Before the jaws are opened or wire is fed downwardly, it is of course necessary to close a circuit which includes the stretch of wire which is in position between the two pairs of jaws. To this end, a switch is provided as can best be seen by reference to Figures 19 and 20. An insulating block 350 is attached to the inside of casing 305 as by screws 351 which if desired may be made readily adjustable so that movement of this block may slightly vary the timing of the switch. Attached to this block are spring contacts 352 and 353. A wire 354 leads from contact 352 to jaw 310 while a wire 355 leads from contact 353 to contact 356 which engages the positive pole of a battery B. To form as desired an electrical path between spring contacts 352 and 353, a conducting bar 357 is attached to a non-conducting switch plate 358. This plate is formed with an opening 360 within which a shouldered block 361 is disposed, the shoulders being effective to permit the switch-plate to slide horizontally on the block and to move vertically with it. This block is attached to pin 329 which, as previously described, is fixed for movement with control strap 328 and also operates main cam plate 313. Therefore, switch 358 moves in accordance with the movement of control strap 328. The circuit is completed by a wire 363 which extends to jaw 316 from the negative pole, not shown, of the battery.

In order to provide horizontal movement of switch plate 358 in relation to block 361 so that the circuit is closed upon the downward movement of this control strap but remains open upon its upward movement, an irregularly shaped rigid camming guide 364 supported by an inward extension from tube 305 engages pin 365 fixed to the switch plate. As the movement of control strap 328 brings the switch plate downwardly, the lower portion of guide 364 cams the switch plate to the right. The circuit is broken at this point. Pin 365 thereupon displaces a freely movable downward end of a leaf spring 367, likewise attached to tube 305, which serves as a differential guide for the subsequent upward movement of the switch structure. Upon the upward movement of this switch structure, as strap 328 is moved after a flashing cycle, spring guide 367 engages pin 365 and causes the switching structure to move straight upwardly, whereby the contact bar does not engage contact springs 352 and 353 and hence the circuit remains open. A tension spring 368 extending between a pin 369 attached to the switch block 358 and main control pin 329 tends normally to force switch block 358 to the left. As pin 365 is brought above the upper portion of spring guide 367, this spring 368 snaps the switch plate to the left ready for a succeeding operation. It will be noted that Figures 19 and 20 show the switch in closed position shortly after the downward movement of the control structure has been begun. Figure 18, however, shows the mechanism in position before a cycle has been begun. Opening movement of the jaws does not begin until pin 329 engages the camming portion of slot 330.

The above description indicates the operations which are performed by the movement of main control strap 328. Movement is transmitted to this strap by a trigger 372 which extends through an opening 373 to the outside of casing 305. This trigger is attached to a short lever 374 pivoted at 375. This lever in turn by a pin 376 working in a slot 377 is operatively attached to the lever 328. This construction is such that downward movement of trigger 372 will move the control structure downwardly. Upward return movement is afforded by compression spring 379 attached to a leftward protuberance 380 of strap 379 and working within a housing 382.

As previously stated in connection with the horizontal model hereof, house current may be applied, where it is available. I may prefer to construct the apparatus so that batteries or current from a main may be used interchangeably.

As previously pointed out, the gap between jaws 309—310 and 315—316 can be changed at will in order to change the effectiveness of each flash. Jaws 315—316, as previously described, are mounted for bodily movement upon an inverted L-shaped control plate 317—318. A right-angled extension of this plate extends to a point outside of casing 305 and terminates in a control button 390 which is formed with a pointer 391 which coacts with calibrations 392 upon the outside of the case indicating the length of wire between the jaws at their several settings and the relative effectiveness thereof. It will be seen that movement of control button 390 upwardly will move jaws 315—316 toward jaws 309—310, bolts 325 permitting free movement of portion 321 of the upper control plate within slot 326 of the main cam control plate. Lower control plate 318 is provided with a leftwardly extending stop 394 which is adapted to engage a stop 395 rightwardly extending from control strap 328. By reference to Figure 18, it will be seen that the downward movement of control strap 328 under propulsion of trigger 372 is limited by the engagement of stops 394 and 395. Therefore, the amount of wire which will be drawn from carrier 306 depends upon the space intervening between these two stops when the trigger is in the inoperative position of Figure 18. The space can be adjusted at will by movement of button 390.

Calibrations 392 indicate primarily the distance by which the jaws are separated—and hence the length of the wire which is to be flashed. I prefer that they indicate also the results which are obtained by the flashing of various types of wire of the stated lengths. For example, the volatilization of a given length of one type of wire produces a given result upon one type of film; but another length of the same wire may be needed for the same result upon film of another type. Indications such as are suggested by the foregoing also may well be included.

A latch is supplied to hold the relatively movable pair of jaws into whatever position it is moved. A rack 397 is formed upon or attached to the depending portion 318 of the lower control plate. Cooperating therewith is a latching leaf spring 399 supported by a light strut 400 which extends from the interior of casing 305. A button 402 disposed exteriorly of the casing and having a long shank 403 releases this latch. Pressure upon the button permits the user to move control member 390 at will but when this pressure is released and the button is permitted to return to the position shown in Figures 17 and 18, the lower pair of jaws will be locked in the position into which it has been moved.

After a flashing operation a small amount of unvolatilized ends of wire falls from the lower lamp to the bottom portion of the mirrors M, M' and R. To permit this material easily to be removed, as shown in Figure 18, a small opening is provided in the lower portion of mirror R, together with a door 411 hinged at 412. A button 413 may be grasped by the fingers to open this door. Normally it is held in a closed position by a leaf spring 414. Similar doors may be applied to the structures of all other forms of the invention.

Certain structural characteristics by which my invention is embodied will now be clear. It will be noted that in both the horizontal and vertical forms of the invention I provide a mounting by the forward portion of which a mirror is supported. Attached to or a part of this mounting is a housing which extends either horizontally or vertically but to the rear or behind this mirror. The two pairs or sets of jaws spaced from each other are disposed within the periphery of the reflecting surface and relatively close thereto with the wire which is supported therebetween forming, upon its volatilization, a line of light which passes through or near the central axis of the curvature of the mirror. Since the jaws are disposed forwardly of the mirror, they are preferably supported by control members or straps which pass therefrom through appropriate openings in the mirror and into engagement with the control mechanism which is housed behind the mirror. Wire from a carrier also disposed and housed to the rear of the mirror is fed to these jaws through an appropriate opening in the mirror. These arrangements result in a compact and optically efficient apparatus, as will be apparent to those skilled in this art. It will be noted that these arrangements apply equally well to both the horizontal and vertical forms by means of which I illustrate my invention.

As shown in Figure 1, a plastic or other transparent protective window 419 may be applied in front of the reflectors M, M' and R. These windows may have any desired and practicable filtering characteristics, as well as serving as protection.

As in the case of the horizontal model by which this invention is illustrated, the above described vertical model preferably includes synchronizing mechanism for connecting and operating a shutter in a camera and advancing a film therein in the desired timed relation to the operation of the flash and the advance of fresh material ready for a succeeding flash. Mechanism to this end, as is shown in Figure 17a, is closely similar to that already illustrated in Figures 22, 23 and 24, and described in connection therewith.

A clamp 425 receives a cable release 426 having a control button 427 and a finger-piece 428. The clamp may be operated by a set screw 429 movable within a slot 430 formed in the side of tube 305, diametrically opposite that shown in Figure 17. This set screw is movable upon a threaded pin, not shown but similar to 268, and having a base, not shown but similar to 269. This clamp also is subject to adjustment.

Cooperating with button 427 of the cable release is an operating head 432 which is moved toward and operates the shutter release by movement of the trigger 372 of the flash-gun. As in the mechanism previously described, it will be clear, therefore, that the mechanism which flashes the wire operates the shutter of a camera. The mechanism connecting operating head 432 and the trigger is placed within a housing 434 upon the front of which, not shown, there may be pointers and indications, such as those shown in Figure 24 and hereinbefore described. A small operating plate 435 is attached to head 432 by rod 436. Pivoted upon this plate at 437 is a dog 438 which is movable to the left by a leaf spring 439 carried by plate 435. This structure is urged upwardly toward its inoperative position by a compression spring 441 which is coiled about the rod 436.

To move this structure downwardly and hence to release the shutter, and as previously stated in many types of camera advance the film, main control pin 329, which operates both the jaws and switch as previously described, is extended into operative contact with a control plate 443 to which there is also attached a guiding pin 444. Pin 329 is attached to this control plate in such manner that the plate may pivot upon it. Pin 444, however, is fixed to this plate and works within a cam slot 446 and guides the plate. It is, of course, understood that pin 329 does not engage with this camming slot, since the movement of pin 329 is directly downwardly. By reason of the above construction, as trigger 372 and hence pin 329 are pulled downwardly, plate 443 also moves downwardly and carries with it dog 438 until such time as guiding pin 444 reaches the camming portion of its slot 446, thereby moving the lower end of plate 444 to the left and releasing dog 438. This dog, under the impulsion of spring 441 aided by the spring of the shutter release, returns the dog to the position shown in Figure 17a, while control plate 443 which is directly connected with operating pin 329 continues downwardly. After main compression spring 379 has returned the main control structure to the position shown in Figure 18, the structure of Figure 17a resumes the position shown therein, ready for the next operation.

Figures 26 and 27 indicate how a camera may be readily mounted upon the structure of Figures 17 and 18. A fixture 451 with a screw-threaded opening for the reception of a supporting bar 452 may be attached to and extend from the side of casing 305 at any convenient point. An enlargement 453 of bar 452 accommodates a set screw 454 with a standard thread which fits a standard threaded opening with which American cameras are provided and having a knurled head so that it can be readily operated by the fingers. Attached by this screw is a camera 456 of a miniature type, as shown, having a shutter operating mechanism of standard type, such as that to which reference has already been made, indicated as 457, and a lens 458. In Figure 27 a view camera 460 is shown with a conventional shutter operating mechanism indicated as 461 to cooperate with a lens 462. Support may be similar in each instance.

Throughout the preceding portion of this specification and in the drawings, I have illustrated my invention as applied to a completely automatic apparatus in which every one of the operable parts is operatively connected with all of the remainder thereof. I have shown a single actuating member by which all of these parts may be operated concomitantly thus automatically providing the desired sequential or other timed relation of each operation. In addition, I have shown this single control mechanism as articulated with that of a camera so that the entire illuminating and photographic unit is jointly operated. Although I much prefer such fully automatic apparatus, it must be understood that my invention may be applied if desired to a device which is not so highly developed in which certain of the parts are operated by isolated hand operations.

Certain of the advantages of this invention will be evident from an examination of the foregoing specification, the attached drawings and the subjoined claims.

Other advantages arise from the provision of a simple cheaply constructed automatic apparatus by means of which a wire or similar material may be automatically effectively and safely volatilized to produce effective artificial illumination for the making of photographs or other purposes.

I claim:

1. In a flash-light apparatus, a wire which upon the application of an electric current is volatilized thereby producing light for photography, an operable clamp comprising two pairs of openable jaws spaced from each other, means for operating said clamp by causing relative movement between the members of each of said pairs of jaws thereby opening said jaws ready for the reception of another stretch of wire, a circuit including one jaw of each of said pairs for applying an electrical current to the stretch of wire clamped between said pairs of jaws to volatilize it, a reflector so disposed as to direct upon an object to be photographed light produced from the stretch of wire between said jaws when it is volatilized, a switch for closing said circuit, and an actuating member whereby an operator may operate said switch to close said circuit.

2. In a flash-light apparatus, a carrier for a wire, two pairs of jaws spaced from each other for positively holding a length of said wire therebetween, each of said pairs comprising a fixed jaw and a jaw movable in relation thereto between a first position wherein a gap is presented between the jaws of each pair whereby upon the revolution of said carrier said wire coiled thereupon is advanced between said jaws and a second position wherein the relatively movable jaw of each pair is disposed in relatively close relation to said relatively fixed jaw of each pair thereby clamping a stretch of said wire between said pairs of jaws, said jaws being so disposed that one of said pairs engages and clamps said stretch of wire adjacent its leading end and the other pair engages and clamps said stretch of wire relatively adjacent to said carrier, means for rotating said carrier while said jaws are in said first or open position, means for moving said jaws between said positions, a circuit including one jaw of each of said pairs for applying an electrical current to a stretch of said wire extending between said jaws when said jaws are in said second or closed position, a reflector so disposed as to direct upon an object to be photographed light produced from the stretch of wire between said jaws when it is volatilized, and a switch for closing said circuit whereby the stretch of wire between said jaws is volatilized by the impact of electrical energy thereby illuminating the object to be photographed.

3. In a flash-light apparatus, a carrier for a wire, two spaced pairs of openable jaws for positively clamping a length of said wire therebetween, moving means for opening and closing said jaws, advancing means for rotating said carrier to advance a length of said wire between said pairs while said jaws are open, mechanism operatively interconnecting said moving means and said advancing means for operating said advancing means while said jaws are open and stopping the operation thereof after a fresh length of said wire has been advanced to a position between said pairs of jaws and said jaws clamped thereupon, a circuit for applying an electrical current to said length of said wire while motionless and clamped between said pairs of jaws to volatilize it thereby producing a flash, switching mechanism for controlling said circuit, and control means operatively interconnecting said advancing means and said switching mechanism for concomitantly operating both thereof.

4. In a flash-light apparatus, a carrier for a wire, means for rotating said carrier to advance wire therefrom, a trigger, movable linkage connecting said carrier advancing means and said trigger for operating said carrier advancing means by the movement of said trigger thereby rotating said carrier and advancing wire therefrom, means for clamping a stretch of the wire which has been advanced by the rotation of said carrier, a circuit for applying an electrical current to the stretch of the wire so clamped, a switch for said circuit, and an operating connection between said trigger and said switch for operating said switch by the movement of said trigger whereby the stretch of wire which has been advanced and clamped is volatilized.

5. In a flash-light apparatus, a carrier for a wire, a ratchet device for rotating said carrier to advance wire therefrom, a pawl for operating said ratchet, a trigger, linkage connecting said pawl and said trigger whereby movement of said trigger operates said ratchet to rotate said carrier thereby advancing wire therefrom, means for clamping in place a stretch of the wire which has been advanced by the rotation of said carrier, a source of electrical current, a circuit connecting said source and including the stretch of wire which is so clamped, a switch for said circuit, the closing of said switch volatilizing said stretch of wire so clamped, and an operating connection between said trigger and said switch for operating said switch by the movement of said trigger whereby the stretch of wire which has been advanced and clamped is volatilized.

6. In a flash-light, a carrier for a wire, two pairs of jaws spaced from each other for clamping therebetween a length of said wire which has been advanced from said carrier, each of said pairs including a fixed jaw and a jaw movable relatively thereto, a common mounting including members interconnecting said movable jaws, a circuit including one of the jaws of each of said pairs, a switch for said circuit, means for moving said mounting in a first direction for opening said jaws, means for moving said mounting in a second and opposite direction for closing said jaws, and a connection between said mounting and said carrier for rotating said carrier upon the movement of said mounting in said first direction thereby advancing said wire from said carrier, said connection being ineffective upon said carrier when said mounting is moved in said second direction.

7. In a flash-light, a carrier for a wire, a clamp comprising two pairs of jaws spaced from each other for clamping therebetween a length of said wire which has been advanced from said carrier, each of said pairs including two jaws one of which is relatively movable in relation to the other, a circuit including one of the jaws of each of said pairs, a switch for said circuit, linkage connecting said relatively movable jaws, means for operating said linkage to move one jaw of each pair in a first direction for opening said clamp, means for operating said linkage to move said movable jaws in a second and opposite direction for closing said clamp, and a connection between said operating means and said carrier for rotating said carrier upon the movement of said operating means in said first direction thereby advancing said wire from said carrier, said connection being ineffective upon said carrier when said mounting is moved in said second direction.

8. In a flash-light apparatus, two pairs of spaced openable jaws, each pair including a relatively fixed jaw and a jaw movable relatively thereto, a carrier for a wire, means for rotating said carrier to advance a length of wire to said jaws while they are open, a trigger, a spring, means connecting said trigger and the movable jaws of each of the said pairs and said spring for moving said movable jaws away from the fixed jaws of each pair against the power of said spring, said spring being effective to return said jaws to closed position when pressure upon said trigger is released, and a motion transmitting connection between said connecting means and said wire advancing means which includes means which operate said carrier advancing means upon the movement of said trigger in a first or operative direction and are ineffective upon said wire advancing means upon the movement of said connection under the influence of said spring in a second or inoperative direction as said spring returns said jaws to closed position to clamp the length of wire already advanced thereto.

9. In a flash-light apparatus, a carrier for a wire, two spaced pairs of openable jaws for positively clamping a length of said wire therebetween, means for opening and closing said jaws, means for rotating said carrier to advance a length of said wire between said pairs while said jaws are open, a circuit for applying an electrical current to said length of said wire clamped between said pairs of jaws to volatilize it, and switching mechanism for closing said circuit, said switching mechanism including operating means connected with said jaw closing means which close said circuit only when said jaws are clamped upon said wire.

10. In a flash-light apparatus, a carrier for a wire, two spaced pairs of openable jaws for positively clamping a length of said wire therebetween, means for opening and closing said jaws, advancing means for rotating said carrier to advance a length of said wire between said pairs while said jaws are open, a circuit for applying an electrical current to said length of said wire clamped between said jaws to volatilize it, and switching mechanism for closing said circuit, said switching mechanism including operating connections with said carrier advancing means which necessarily maintain said circuit open while said wire is being advanced.

11. In a flash-light apparatus, a carrier for a wire, two pairs of jaws spaced from each other for clamping a length of said wire motionless therebetween, means for moving one of said jaws of each of said pairs relatively to the other thereof for opening and closing said pairs of jaws, advancing means for rotating said carrier to advance said wire, control mechanism including devices operatively interconnecting said moving means and said advancing means for rotating said carrier while said jaws are open and maintaining said carrier motionless while said jaws are closed, a circuit for applying an electrical current to said stretch of wire clamped motionless between said pair of jaws, and a switch for closing said circuit thereby volatilizing said length of wire.

12. In a flash-light apparatus, a carrier for a wire, two pairs of jaws spaced from each other for clamping a length of said wire motionless therebetween, means for moving one of said jaws of each of said pairs relatively to the other thereof, means for rotating said carrier to advance said wire while the jaws of each of said pairs are separated, an electrical circuit for applying a current to the stretch of said wire clamped between said jaws to volatilize it, a switch for closing said circuit, and control mechanism operatively interconnecting said jaw-moving means said carrier-advancing means and said switch and including instrumentalities for concomitantly operating all thereof.

13. In a flash-light apparatus, a carrier for a wire, advancing means for rotating said carrier to advance said wire therefrom, two pairs of jaws spaced from each other for receiving said wire which has been advanced from said carrier, each of said jaws including a fixed jaw and a jaw movable relatively thereto, moving means operatively interconnecting both of said movable jaws for moving each thereof relatively to the other jaw of the respective pair thereby concomitantly opening and closing each of said pairs, a circuit including one jaw of each of said pairs for applying an electrical current to a stretch of said wire extending therebetween when said jaws are closed, a switch for closing said circuit thereby volatilizing said stretch of said wire, control mechanism operatively interconnecting said moving means and said advancing means and including devices which move said carrier to advance wire from said carrier to said jaws while they are open and to maintain said carrier immovable except while said jaws are open, and an actuating member for said control mechanism.

14. In a flash-light apparatus, a carrier for a wire, two spaced pairs of openable jaws for clamping therebetween a length of said wire which has been advanced from the carrier, each of said pairs comprising a fixed jaw and a jaw movable in relation thereto between a first position wherein it is disposed relatively far from said fixed jaw whereby said wire from the carrier may be advanced therebetween and a second position wherein it is disposed relatively close to said fixed jaw thereby clamping said wire into position, means for moving said movable jaws from said second or closed to said first or open position, a circuit for applying an electrical current to one of said jaws of each of said pairs thereby volatilizing the stretch of wire therebetween, a switch for said circuit, and sequential control mechanism, said control mechanism comprising an actuating member and operating connections between said actuating member said switch and said moving means for operating said switch to close said circuit upon the first portion of the movement of said actuating member thereby volatilizing the stretch of said wire between said pairs of jaws and upon a second or succeeding portion of said movement for operating said moving means to open said jaws ready for the replacement of the wire therebetween for a new cycle of operations.

15. In a flash-light apparatus, a carrier for a wire, means for rotating said carrier to advance said wire supported thereupon, said rotating means comprising a driving and a driven member, two pairs of jaws spaced from each other for receiving wire which is advanced by the rotation of said carrier, each of said pairs comprising a fixed jaw and a jaw movable relatively thereto, a circuit for applying an electrical current to a jaw of each of said pairs whereby upon the closing of said circuit the stretch of said wire clamped therebetween is volatilized, a switch for operating said circuit, said switch comprising a fixed member and a relatively movable member, movable control mechanism, said driving member of said carrier-rotating means said movable jaw of each pair and said movable element of said switch being mounted for movement with said movable control mechanism, and an actuating member for moving said control mechanism whereby upon its movement the rotation of said carrier and the opening and closing of said jaws and the operation of said switch are carried out in predetermined timed relation.

16. In a flash-light apparatus, a carrier for a wire, means for rotating said carrier to advance said wire, two pairs of jaws spaced from each other, each of said pairs comprising a fixed jaw and a jaw movable in relation thereto between a first position wherein it is disposed relatively far from said fixed jaw whereby said wire from the carrier may be advanced therebetween and a second position wherein it is disposed relatively close to said fixed jaw thereby clamping said wire into position, means for moving said movable jaws between said positions, a circuit for applying an electrical current to one of said jaws of each of said pairs thereby volatilizing the stretch of said wire therebetween, a switch for said circuit, and sequential control mechanism, said sequential control mechanism including a movable actuating member and operating connections between said actuating member and all of said means which are effective upon the movement of said actuating member when said device is prepared for operation first for closing said circuit thereby volatilizing the wire second for opening said circuit third for opening said jaws fourth for rotating said carrier to advance fresh wire to position between the jaws and fifth for closing said jaws to clamp the wire in place ready for another cycle.

17. In a flash-light apparatus, a carrier for a wire, two pairs of jaws spaced from each other for receiving said wire which has been advanced from said carrier, each of said pairs including a fixed jaw and a jaw movable relatively thereto, a mounting upon which each of said movable jaws is movable relatively to said fixed jaw, means operatively interconnecting both of said mountings for moving said mountings in one or a first direction to open both pairs of said jaws and in another or a second direction to close them, and an operating connection between said moving means and said carrier which moves said carrier to advance said wire concomitantly with the movement of said mountings in said first direction to open said jaws and is without effect thereupon during the movement of said mounting in said second direction to close said jaws.

18. In a flash-light apparatus, a carrier for a wire, two pairs of openable jaws spaced from each other for positively holding therebetween a length of said wire which has been advanced from said carrier each of said pairs including a fixed jaw and a jaw movable relatively thereto, means for bodily moving one of said pairs toward and away from the other pair thereby adjusting the gap therebetween and hence the stretch of said wire which may extend therebetween, means for rotating said carrier thereby advancing said wire, means effective irrespective of the position to which said bodily movable pair may have been moved for moving said movable jaws of each pair in relation to said fixed jaws thereof whereby a length of wire extending between said pairs of jaws may be clamped into position, and means for volatilizing the length of wire between said pairs while it is clamped therebetween.

19. In a flash-light apparatus, a carrier for a wire, two pairs of openable jaws spaced from each other for holding therebetween a length of said wire which has been advanced from said carrier, each of said pairs including a fixed jaw and a jaw movable relatively thereto, a first mounting for one of said pairs upon which both jaws thereof are bodily movable in relation to said other pair thereby changing the gap between said pairs and hence the stretch of said wire which may extend therebetween, a second mounting for said movable jaw of said bodily movable pair for moving said jaw in relation to said fixed jaw of said pair to open and close each pair, said second mounting being supported upon said first mounting and movable both therewith and relatively thereto, a third mounting for said movable jaw of said relatively fixed jaw of said pair, operating mechanism operatively interconnecting said second and third mountings for concomitantly moving said mountings thereby opening and closing said pairs of jaws in timed relation, means for moving said first mounting in relation to said second mounting thereby changing the gap between said pairs and hence the length of said wire which may extend therebetween while maintaining the effectiveness of said operating mechanism whereby said movable jaw of said bodily movable pair may be moved irrespective of the position of said movable pair relatively to said fixed pair, and means for volatilizing the stretch of said wire which is held between said pairs of jaws when they are closed.

20. In a flash-light apparatus, two pairs of openable jaws, a first pair and second pair, each pair being separated from the other and said pairs being adapted for clamping a length of wire therebetween, each of said pairs including a fixed jaw and a jaw movable relative thereto whereby a length of said wire may be clamped between said pairs of jaws, and means for mounting said first and second pairs of jaws, said mounting means including a first support for said first pair whereon both of the jaws thereof are bodily movable along a line which extends between said first and second pair, a second support for the movable jaw of said first pair, said second support being connected with said first support for bodily movement therewith along said line as spacing between said jaws is changed and movement relative to said fixed support in a direction substantially normal to said line as said pairs of jaws are opened or closed, a third support for the relatively movable member of said second pair of jaws, said third support being movable in a direction substantially normal to said line extending between said pairs, a connection between said second support and said third support whereby the two are moved concomitantly, a fourth and fixed support for the fixed member of said second pair, means for moving said first support along said line thereby changing the spacing between said jaws, a trigger, and a connection between said trigger and said second and third supports for moving said second and third supports in said direction normal to said line thereby opening or closing said jaws upon movement of said trigger.

21. In a flash-light apparatus, a carrier for a wire, two pairs of jaws for holding clamped therebetween a length of said wire which has been advanced from said carrier, said pairs being spaced from each other and one of said pairs being bodily movable in relation to the other thereof for changing the gap therebetween and hence the stretch of said wire which may extend therebetween, means for separating the jaws of each of said pairs, means for bodily moving said movable pair in relation to said relatively fixed pair, means for advancing said wire between said jaws of each of said pairs while they are separated, said means for advancing said wire including instrumentalities which limit the wire which is advanced to a length equal to the space intervening between said jaws, and means for volatilizing the stretch of wire which is clamped between said pairs of jaws.

22. In a flash-light apparatus, a carrier for a wire, two pairs of jaws spaced from each other for clamping therebetween a length of said wire which has been advanced from said carrier, means for bodily moving one of said pairs of jaws toward and away from the other thereof to change the gap therebetween and hence the stretch of said wire held therebetween, means for opening and closing the jaws of each of said pairs, means for rotating said carrier to advance said wire between said jaws while they are open, control mechanism operatively interconnecting said rotating means and said movable pair of jaws for moving said rotating means to an extent sufficient to advance wire of a length equal to the gap then existing between said pairs of jaws, and means for volatilizing the length of said wire which is clamped between said jaws.

23. In a flash-light apparatus, a carrier for a wire, operable means engaging said wire at two spaced points for clamping a length of said wire which has been advanced from said carrier, means for advancing wire from said carrier to said clamping means, means for adjusting said clamping means for varying the spacing of the points at which said clamping means engage the wire so that different lengths of said wire may be clamped thereby, and means operatively connected to said adjusting means for rotating said carrier to an extent necessary to advance a length of said wire equal to the current spacing of the points at which the wire is engaged.

24. In a flash-light apparatus, a mirror having a curved reflecting surface, a carrier for a wire, two pairs of openable jaws spaced from each other for clamping therebetween a length of said wire which has been advanced from said carrier, each of said pairs including a fixed jaw and a jaw movable relatively thereto whereby a length of said wire may be clamped between said pairs of jaws, said jaws being positioned opposite and within the periphery of said reflecting surface and relatively adjacent thereto and centrally thereof and being so disposed in relation to the curvature of said surface that said length of said wire passing between said pairs passes through approximately the central axis of curvature of said reflecting surface, means for bodily moving one of said pairs toward and away from the other thereby adjusting the gap therebetween and hence the stretch of said wire which may extend therebetween, and means for volatilizing the stretch of said wire while it is clamped between said pairs of jaws.

25. In a flash-light apparatus, a mirror having a curved reflecting surface, two pairs of jaws spaced from each other and positioned opposite and within said reflecting surface and relatively adjacent thereto and centrally thereof and so disposed in relation to the curvature of said surface that a line of illumination between said pairs passes through approximately the central axis of curvature of said mirror, means for clamping a wire between said jaws, a circuit including one jaw of each of said pairs for supplying an electrical current to the wire extending between said jaws, a source of electrical energy for said circuit sufficient to volatilize said wire upon the closing of said circuit thereby producing a line of light between said pairs of jaws closely adjacent the principal focus of said reflecting surface, and a switch for closing said circuit.

26. In a flash-light apparatus, a mounting, a mirror attached to a forward side of said mounting, two pairs of openable jaws spaced from each other and disposed opposite the reflecting surface of said mirror and relatively adjacent thereto and centrally thereof, a carrier for supplying a length of wire which is clamped between said jaws, said carrier being supported by said mounting and disposed to the rear of said mirror and said wire extending through an opening in said reflecting surface and passing between the jaws of each of said pairs thereby forming a line extending between said pairs and disposed relatively close to said surface, said surface being provided with such an opening, a circuit which includes one jaw of each of said pairs for supplying an electrical impact to the length of the wire extending therebetween, and a switch for closing said circuit thereby volatilizing said length of wire.

27. In a flash-light apparatus, a mirror, two pairs of openable jaws spaced from each other and disposed opposite the reflecting surface of said mirror and relatively adjacent thereto and centrally thereof, a carrier for a wire a length of which is clamped between said pairs of said jaws, said carrier being disposed to the rear of said mirror and said wire extending therethrough and between the jaws of each of said pairs, control means for closing each pair of said jaws thereby clamping the length of said wire therebetween and for opening each thereof preparatory to an advance from said carrier of a new length of said wire therebetween, said control means including actuating mechanism disposed to the rear of said mirror and an operating connection extending therefrom through openings in said mirror to said jaws, said mirror being provided with such openings, an electrical circuit which includes one jaw of each of said pairs for applying an electrical impact to the length of wire therebetween, and a switch for closing said circuit thereby volatilizing said length of said wire.

28. In a flash-light apparatus, a mounting, a mirror attached to a forward side of said mounting, two pairs of jaws spaced from each other and disposed opposite the reflecting surface of said mirror and relatively adjacent thereto and centrally thereof, a housing disposed upon said mounting to the rear of said mirror, a carrier for a wire a length of which is clamped between said jaws of each of said pairs, said carrier being disposed within said housing and said wire extending therefrom and through an opening in said mirror and to a position between said jaws of each of said pairs, means disposed within said housing for rotating said carrier to advance said wire therefrom toward said jaws, moving means disposed within said housing for opening and closing said jaws, connections between said moving means extending from said housing through openings in said mirror to said jaws, said mirror being provided with said above-mentioned openings, a circuit for applying an electrical current to one jaw of each of said pairs for volatilizing the length of said wire extending therebetween, said circuit being extended from said housing to said jaws, and a switch for said circuit disposed within said housing.

29. In a flash-light apparatus, a mounting, means for supporting a camera upon said mounting; said camera having a lens, a shutter therefor, and means for opening and closing said shutter; a first mechanism disposed upon said mounting for advancing material to be flashed to a position wherefrom it may illuminate objects in line with said lens and for supporting said material in such position, a movable trigger disposed upon said mounting, means for flashing said material, a second or control mechanism operatively interconnecting said trigger and said means for operating said shutter and said means for flashing said material, said control mechanism including instrumentalities for operating said shutter and concomitantly flashing said material upon a first portion of the movement of said trigger, instrumentalities thereafter effective for breaking the connection between said trigger and said shutter operating means, and instrumentalities effective upon a succeeding portion of the movement of said trigger for operating said first mechanism thereby preparing for a subsequent cycle of operations.

30. In a flash-light apparatus, mounting means for supporting a camera upon said mounting, said camera having a lens, a shutter therefor, means for opening and closing said shutter, a first mechanism disposed upon said mounting for advancing material to be flashed to a position wherefrom it may illuminate objects in line with said lens and for supporting said material in such position, a movable trigger disposed upon said mounting, means for flashing said material, a second or control mechanism operatively interconnecting said trigger and said means for operating said shutter and said means for flashing said material, said control mechanism including instrumentalities for operating said shutter and concomitantly flashing said material upon a first portion of the movement of said trigger, instrumentalities thereafter effective for breaking the connection between said trigger and said shutter operating means, instrumentalities effective upon a succeeding portion of the movement of said trigger for operating said first mechanism thereby preparing for a subsequent cycle of operations, and instrumentalities thereafter effective for reestablishing the connection between said trigger and said shutter-operating means.

31. In the flash-light apparatus, a mounting, a mirror attached to one side of said mounting, two pairs of openable jaws spaced from each other and disposed adjacent and before the reflecting surface of said mirror, a carrier for supplying a length of wire which is clamped between said jaws, said carrier being supported by said mounting, means for rotating said carrier to advance wire from said carrier to said jaws, means for volatilizing said length of wire clamped between said jaws, means for alternately opening and closing said jaws whereby after the volatilization of one length of wire another thereof may be put into place preparatory to a succeeding cycle of operation, said carrier and all of said means being supported by said mounting and disposed upon the side of said mirror opposite that upon which said jaws are disposed, means upon said mounting for supporting a camera thereupon, said camera having a lens, a shutter, and means for operating said shutter, a trigger supported by said mounting, a connection between said trigger and said means for opening and closing said jaws and said means for advancing said wire for operating both of said means upon the movement of said trigger, an actuating connection extending between said shutter operating means and said trigger for actuating said shutter operating means by the movement of said trigger, means for volatilizing said wire by the movement of said trigger, means for destroying said connection between said trigger and shutter operating means and said wire volatilizing means after both thereof have been operated, actuating connections between said trigger and said means for rotating said carrier and said means for opening and closing said jaws including instrumentalities which render said connections effective after the destruction of said connection between said trigger and said shutter operating means and said volatilizing means, so that a new length of said wire is advanced into position ready for a subsequent cycle independently of the operation of said shutter and the volatilization of said wire, and means for thereafter re-establishing said connection between said trigger and said shutter operating means and said volatilizing means ready for said new cycle.

32. An apparatus for taking artificially illuminated photographs which comprises a light excluding box, said box being provided with a support for light sensitive material and an opening opposite said material so supported, a lens for said opening, a shutter for said lens, means for operating said shutter, a carrier for a wire, means for advancing wire from said carrier to a position wherein upon its volatilization it illuminates an object in line with said lens, means for clamping a length of said wire in said position, means for volatilizing said wire in said position, and sequential control mechanism, said mechanism including an actuating member and means operatively connecting said actuating member and all of said means and including instrumentalities which upon a first portion of the movement of said actuating member actuate said shutter operating means and said volatilizing means and upon a second portion of said movement destroy the operative connection between said actuating member and said shutter opening means and said volatilizing means and upon third portion of said movement operate said wire advancing means and said clamping means and finally reestablish said connection between said actuating member and said shutter operating means and said volatilizing means in preparation for a subsequent cycle.

33. An apparatus for taking artificially illuminated photographs which comprises a light-excluding box, said box being provided with a support for light-sensitive material and an opening opposite said material, a lens for said opening, a shutter for said lens, means for operating said shutter a curved mirror, a carrier for a wire, means for advancing said wire to a position adjacent said mirror and substantially in line with a central axis of the curvature thereof, means for clamping said wire in such position, means for applying an electrical current to said wire after it has been disposed in said position, said mirror being so disposed that upon the volatilization of said wire light so caused will be directed toward an object in line with said lens, and sequential control mechanism operatively interconnecting said means for advancing said wire to said position and said means for operating said shutter for operating said wire-advancing means after the operation of said shutter-operating means thereby preparing for a new cycle of operations.

34. An apparatus for taking artificially illuminated photographs which comprises a light-excluding box, said box being provided with a support for light-sensitive material and an opening opposite said material, a lens for said opening, a shutter for said lens, means for operating said shutter, a carrier for a wire, means for rotating said carrier to advance a length of said wire, two pairs of openable jaws spaced from each other for positively holding therebetween a length of said wire which has been advanced, means for opening a jaw of each pair to permit the introduction of said length of said wire, means for closing said jaws thereby clamping the wire in place, means for applying an electrical current to said stretch of said wire between said jaws when said jaws are closed thereupon thereby volatilizing said length of said wire, an operating connection between said means for operating said shutter and said volatilizing means for necessarily concomitantly operating both thereof, and means thereafter effective for operating said wire-advancing means for advancing a fresh portion of said wire into said position ready for another cycle of operations.

35. An apparatus for taking artificially illuminated photographs which comprises a light-excluding box, said box being provided with a support for light-sensitive material and an opening opposite said material, a lens for said opening, a shutter for said lens, means for operating said shutter, a carrier for a wire, means for rotating said carrier to advance a length of said wire, two pairs of openable jaws spaced from each other for positively holding therebetween a length of said wire which has been advanced, means for opening said jaws of each pair to permit the introduction of said length of said wire, means for closing said jaws thereby clamping the wire in place, means for applying an electrical current to said stretch of said wire between said jaws when said jaws are closed thereupon thereby volatilizing said length of wire, operating connections between said means for operating said shutter, said wire-advancing means and said volatilizing means, and sequential control means for said operating connections including devices for necessarily operating each of said means in timed relation to the operation to the others thereof.

36. An apparatus for taking artificially illuminated photographs which comprises a light-excluding box, said box being provided with a support for light sensitive material and an opening opposite said material, a lens for said opening, a shutter for said lens, means for operating said shutter, a carrier for a wire, means for rotating said carrier to advance a length of said wire, two pairs of openable jaws spaced from each other for positively holding therebetween a length of said wire which has been advanced, means for opening one of said jaws of each pair to permit the introduction of said length of said wire, means for closing said jaws thereby clamping said wire in place, means for applying an electrical current to said stretch of said wire between said jaws when said jaws are closed thereupon thereby volatilizing said length of said wire, an operating connection between said means for operating said shutters and said volatilizing means for concomitantly operating both thereof, an actuating member for said operating connection, and sequential control means operatively interconnecting said jaw opening means said wire advancing means and said jaw closing means and adapted for actuation after the actuation of said operating connection and including devices for first opening said jaws second rotating said carrier to advance a fresh length of said wire therebetween and third clamping said jaws closed upon said wire ready for a subsequent cycle of operations.

37. An apparatus for taking artificially illuminated photographs which comprises a light-excluding box, said box being provided with a support for light-sensitive material and an opening opposite said material, a lens for said opening, a shutter for said lens, means for opening and thereafter closing said shutter, a carrier for a wire, two pairs of openable jaws spaced from each other for clamping therebetween a length of wire which has been advanced from said carrier, each of said pairs comprising a fixed jaw and a jaw movable in relation thereto between a first position wherein a gap is presented between the jaws of each pair whereby upon the revolution of said carrier the wire coiled thereupon is advanced between said jaws and a second position wherein a relatively movable jaw of each pair is disposed in relatively close relation to said relatively fixed jaw of each pair thereby clamping a stretch of the wire between said pairs of jaws, means for moving said jaws from said second to said first position, means for moving said jaws from said first to said second position, means for rotating said carrier while said jaws are in said first or open position to advance the wire between said positions, a circuit including one jaw of each of said pairs for applying an electrical current to a stretch of wire extending between said jaws when said jaws are in said second or closed position, a switch for said circuit, means for operating said switch for closing and thereafter opening said circuit whereby the stretch of wire between said jaws is volatilized by the impact of electrical energy, an actuating member, and sequential control mechanism operatively interconnecting said actuating member and all of said means and including devices which first operate said means for closing and thereafter opening said switch and said means for opening and thereafter closing said shutter and second and thereafter operate said jaw-opening means to move said jaws from said second to said first position to open said jaws and third operate said means for rotating said carrier thereby advancing a fresh length of wire therebetween, and fourth operate said means for moving said jaws from said first to said second position wherein said length of wire is clamped between said jaws ready for a subsequent cycle.

38. A photographic apparatus comprising a light excluding box, means for supporting light-sensitive material in said box, a lens for directing light upon said material, a shutter for alternatively admitting and excluding light from said lens, said lens and said shutter being mounted upon said box, means for operating said shutter, means for moving said light-sensitive material to advance a fresh portion thereof to a position in said box opposite said lens, an operating connection between said shutter and said material-advancing means whereby said material is advanced and said shutter operated in timed relation, a carrier for a wire which upon volatilization will illuminate an object to be so photographed upon said light-sensitive material, two pairs of jaws spaced from each other for positively holding a length of said wire, one jaw of each of said pairs being movable in relation to the others thereof, a curved reflecting surface for directing such illumination upon such object, said jaws being disposed adjacent said surface and near a central axis thereof, means for opening said movable jaw of each pair to permit the introduction of a fresh length of said wire after such volatilization, means for closing said movable jaws thereby clamping such length of said fresh wire in place, means for applying an electrical current to said stretch of said wire between said jaws when said jaws are closed thereupon thereby illuminating said object with light which is reflected upon said lens and directed thereby upon said light-sensitive material, means for rotating said carrier to advance fresh wire between said jaws after the volatilization of the length previously therebetween, an operating connection between said shutter and said wire-advancing means and including instrumentalities for necessarily operating said wire-advancing means said shutter and said material-advancing means in predetermined timed relation, and a common mounting for said box said carrier said jaws said reflecting surface and all of said means.

CARL LOUIS OSWALD.